(12) United States Patent
Gonsa et al.

(10) Patent No.: US 9,131,501 B2
(45) Date of Patent: Sep. 8, 2015

(54) DYNAMIC PUSCH DEACTIVATION/ACTIVATION FOR COMPONENT CARRIERS OF A RELAY NODE

(75) Inventors: Osvaldo Gonsa, Friedrichsdorf (DE); Joachim Loehr, Wiesbaden (DE); Sujuan Feng, Frankfurt (DE); Christian Wengerter, Kleinheubach (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 83 days.

(21) Appl. No.: 13/993,852

(22) PCT Filed: Mar. 1, 2012

(86) PCT No.: PCT/EP2012/000899
§ 371 (c)(1),
(2), (4) Date: Aug. 16, 2013

(87) PCT Pub. No.: WO2012/123070
PCT Pub. Date: Sep. 20, 2012

(65) Prior Publication Data
US 2013/0343261 A1  Dec. 26, 2013

(30) Foreign Application Priority Data

Mar. 17, 2011 (EP) .................................... 11158707

(51) Int. Cl.
*H04W 76/04* (2009.01)
*H04B 7/26* (2006.01)
*H04L 5/00* (2006.01)
*H04W 88/08* (2009.01)

(52) U.S. Cl.
CPC ........... *H04W 76/045* (2013.01); *H04B 7/2606* (2013.01); *H04L 5/001* (2013.01); *H04W 76/048* (2013.01); *H04W 88/08* (2013.01)

(58) Field of Classification Search
CPC ................................................... H04B 7/15542
See application file for complete search history.

(56) References Cited

U.S. PATENT DOCUMENTS

2010/0103860 A1* 4/2010 Kim et al. .................... 370/315
2011/0103326 A1* 5/2011 Kim et al. .................... 370/329

OTHER PUBLICATIONS

Nokia Siemens networks (3gpp TSG-RAN EG2 Meeting #0070, May 10-14, 2010, R2-102768, pp. 1-2).*
European Search Report for Application No. 11158707.7-1246 dated Aug. 3, 2011.
(Continued)

*Primary Examiner* — Maharishi Khirodhar
(74) *Attorney, Agent, or Firm* — Pearne & Gordon LLP

(57) ABSTRACT

The invention relates to a method for dynamically controlling the PUSCH of a SCell in a backhaul link of a communication system utilizing a relay node with carrier aggregation, where the SCell is inband with respect to the access link between the relay node and the UEs. In order to avoid subframe blocking due to inband operation, the PUSCH of an SCell may be deactivated. The new downlink-only configuration of the SCell allows the relay node to use all resources of the SCell for scheduling resources for uplink and downlink transmissions in the access link. The PUSCH may deactivated and activated e.g. depending on the need for higher data rates in the uplink and downlink of the access link between the relay node and the UEs. The decision to deactivate/activate the PUSCH of an SCell may be taken by the DeNB or the relay node.

19 Claims, 17 Drawing Sheets

(56) References Cited

OTHER PUBLICATIONS

NTT DOCOMO et al: "UL SCell activation/deactivation", 3GPP Draft; RZ-103963, 3RO Generation Partnership Project (3GPP), Mobile Competence Centre ; 650, Route Des Lucioles ; F-06921 Sophia-Antipolis Ceoex; France, vol. RAN WG2, no. Stockholm, Sweden; 20100628, Jun. 22, 2010, XP050451316.

3GPP TS 36.211 v8.9.0, 3rd Generation Partnership Project; Technical Specification Group Radio Access Network; Evolved Universal Terrestrial Radio Access (E-UTRA); Physical Channels and Modulation (Release 8), Dec. 2009.

3GPP TS 36.212 v9.9.0, 3rd Generation Partnership Project; Technical Specification Group Radio Access Network; Evolved Universal Terrestrial Radio Access (E-UTRA); Multiplexing and Channel Coding (Release 9), Dec. 2009.

* cited by examiner

PRIOR ART

PRIOR ART

PRIOR ART

PRIOR ART

| | Flag 0/1A | Loc/Distr | MCS | HARQ | NDI | RV | TPC | RBA | Pad |
|---|---|---|---|---|---|---|---|---|---|
| 1.4 MHz | Flag 0/1A | Loc/Distr | MCS | HARQ | NDI | RV | TPC | RBA | Pad |
| 3 MHz | Flag 0/1A | Loc/Distr | MCS | HARQ | NDI | RV | TPC | RBA | |
| 5 MHz | Flag 0/1A | Loc/Distr | MCS | HARQ | NDI | RV | TPC | RBA | Pad |
| 10 MHz | Flag 0/1A | Loc/Distr | MCS | HARQ | NDI | RV | TPC | RBA | |
| 15 MHz | Flag 0/1A | Loc/Distr | MCS | HARQ | NDI | RV | TPC | RBA | |
| 20 MHz | Flag 0/1A | Loc/Distr | MCS | HARQ | NDI | RV | TPC | RBA | | new1

| RN C-RNTI/IMSI/TIMSI | target CC ID | ON/OFF flag [1 bit for all HARQ processe or 8 bits-bitmap identifying single HARQ processes ID] |
|---|---|---| new2

| RN C-RNTI/IMSI/TIMSI | ON/OFF flag [1 bit for all HARQ processe or 8 bits-bitmap identifying single HARQ processes ID] |
|---|---| new3

| ON/OFF flag [1 bit for all HARQ processe or 8 bits-bitmap identifying single HARQ processes] |
|---|

Fig. 16

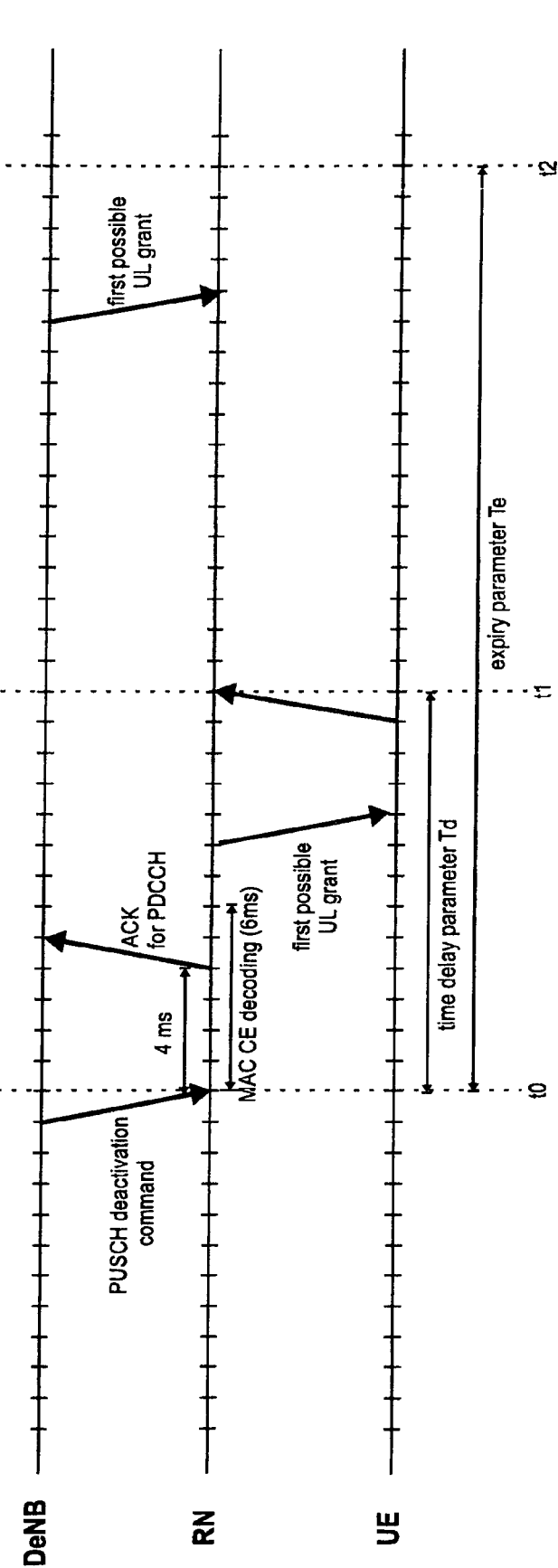

DYNAMIC PUSCH DEACTIVATION/ACTIVATION FOR COMPONENT CARRIERS OF A RELAY NODE

CROSS-REFERENCE TO RELATED APPLICATIONS

This is a national stage of International Patent Application No. PCT/EP 2012/000899 filed on Mar. 1, 2012, which claims priority to European Patent Application No. 11158707.7 filed on Mar. 17, 2011.

FIELD OF THE INVENTION

The invention relates to a method for dynamically configuring an uplink shared channel of a relay node, and to a base station and a relay node for participating in said method.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UT-RAN) is to be finalized as Release 8 (LTE). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

LTE Architecture

The overall architecture is shown in FIG. 1 and a more detailed representation of the E-UTRAN architecture is given in FIG. 2.

The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs.

The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Layer 1/Layer 2 (L1/L2) Control Signaling

In order to inform the scheduled users about their allocation status, transport format and other data related information (e.g. HARQ information, transmit power control (TPC) commands), L1/L2 control signaling is transmitted on the downlink along with the data. L1/L2 control signaling is multiplexed with the downlink data in a sub-frame, assuming that the user allocation can change from sub-frame to sub-frame. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI. The L1/L2 control signaling is transmitted on the Physical Downlink Control Channel (PD- CCH). It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:
- A user identity indicating the user(s) that is/are allocated the resources.
- RB allocation information for indicating the resources (Resource Blocks (RBs)) on which a user(s) is/are allocated. The number of allocated resource blocks can be dynamic.
- The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:
- Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)
- Cat 3 information: HARQ related information, e.g. hybrid ARQ process number, redundancy version, retransmission sequence number Downlink control information occurs in several formats that differ in overall size and also in the information contained in its fields. The different DCI formats that are currently defined for LTE Release 8/9 (3GPP LTE) are described in detail in 3GPP TS 36.212, "Multiplexing and channel coding (Release 9)", version 8.8.0 or 9.0.0, section 5.3.3.1 (available at www.3gpp.org and incorporated herein by reference).

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:
- The physical resource(s) on which the data is transmitted (e.g. subcarriers or subcarrier blocks in case of OFDM, codes in case of CDMA). This information allows the UE (receiver) to identify the resources on which the data is transmitted.
- When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e. the cross-scheduled component carrier does not carry any L1/L2 control signaling.
- The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.
- Hybrid ARQ (HARQ) information:
  - HARQ process number: Allows the user equipment to identify the hybrid ARQ process on which the data is mapped.
  - Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
  - Redundancy and/or constellation version: Tells the user equipment, which hybrid ARQ redundancy version is used (required for de-rate-matching) and/or which modulation constellation version is used (required for demodulation).
  - UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:
- The physical resource(s) on which the user equipment should transmit the data (e.g. subcarriers or subcarrier blocks in case of OFDM, codes in case of CDMA).
- When user equipment is configured to have a Carrier Indication Field (CIF) in the L1/L2 control signaling, this information identifies the component carrier for which the specific control signaling information is intended. This enables assignments to be sent on one component carrier which are intended for another component carrier.

This other, cross-scheduled component carrier may be for example a PDCCH-less component carrier, i.e. the cross-scheduled component carrier does not carry any L1/L2 control signaling.
- L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
  HARQ Process number Tells the user equipment from which hybrid ARQ process it should pick the data.
  Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
  Redundancy and/or constellation version: Tells the user equipment, which hybrid ARQ redundancy version to use (required for rate-matching) and/or which modulation constellation version to use (required for modulation).
  UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:
  HARQ process number may not be needed, i.e. is not signaled, in case of a synchronous HARQ protocol.
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as e.g. pre-coding, may be additionally included in the control signaling.
  In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e. the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Physical Downlink Control Channel (PDCCH)

The physical downlink control channel (PDCCH) carries the L1/L2 control signaling, i.e. transmit power control commands and the scheduling grants for allocating resources for downlink or uplink data transmission. To be more precise, the downlink control channel information (i.e. the DCI contents, respectively, the L1/L2 control signaling information) is mapped to its corresponding physical channel, the PDCCH. This "mapping" includes the determination of a CRC attachment for the downlink control channel information, which is a CRC calculated on the downlink control channel information being masked with an RNTI, as will explained below in more detail. The downlink control channel information and its CRC attachment are then transmitted on the PDCCH (see 3GPP TS 36.212, sections 4.2 and 5.3.3).

To form the PDCCH payload, the DCI undergoes channel coding: addition of a CRC attachment followed by convolutional coding and rate matching according to PDCCH format capacity. The coded DCI bits i.e. PDCCH payload, are then mapped to Control Channel Elements (CCEs) according to the PDCCH format. The UE finds the PDCCH specific to it by monitoring a set of PDCCH candidates (a set of consecutive CCEs on which PDCCH could be mapped) in every subframe. The UE uses its Radio Network Temporary Identifier (RNTI) to try and decode candidates. The RNTI is used to de-mask a PDCCH candidate's CRC. If no CRC error is detected the UE determines that PDCCH carries its own control information. Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE (Release 8/9), a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

Downlink control channel information in form of DCI transports downlink or uplink scheduling information, requests for aperiodic CQI reports, or uplink power control commands for one RNTI (Radio Network Terminal Identifier). The RNTI is a unique identifier commonly used in 3GPP systems like 3GPP LTE (Release 8/9) for destining data or information to a specific user equipment. The RNTI is implicitly included in the PDCCH by masking a CRC calculated on the DCI with the RNTI—the result of this operation is the CRC attachment mentioned above. On the user equipment side, if decoding of the payload size of data is successful, the user equipment detects the DCI to be destined to the user equipment by checking whether the CRC on the decoded payload data using the "unmasked" CRC (i.e. after removing the masking using the RNTI) is successful. The masking of the CRC code is for example performed by scrambling the CRC with the RNTI.

In 3GPP LTE (Release 8) the following different DCI formats are defined:

Uplink DCI Formats:
Format 0 used for scheduling of PUSCH
Format 3 is used for transmission of TPC commands for PUCCH and PUSCH with 2 bit power adjustments (multiple UEs are addressed)
Format 3A is used for transmission of TPC commands for PUCCH and PUSCH with single bit power adjustments (multiple UEs are addressed)

Downlink DCI Formats:
Format 1 used for transmission of DL SCH assignments for SIMO operation, i.e. scheduling of one PDSCH codeword
Format 1A used for compact transmission of DL SCH assignments for SIMO operation, i.e. used for compact scheduling of one PDSCH codeword and random access procedure initiated by a PDCCH order
Format 1B used to support closed loop single rank transmission with possibly contiguous resource allocation, i.e. for compact scheduling of one PDSCH codeword with precoding information
Format 1C is for downlink transmission of paging, RACH response and dynamic BCCH scheduling, i.e. is used for very compact scheduling of one PDSCH codeword
Format 1D is used for compact scheduling of one PDSCH codeword with precoding and power offset information
Format 2 is used for transmission of DL-SCH assignments for closed-loop MIMO operation
Format 2A is used for transmission of DL-SCH assignments for open-loop MIMO operation For further information on the LTE physical channel structure in downlink and the PDSCH and PDCCH format, see Stefania Sesia et al., "LTE—The UMTS Long Term Evolution", Wiley & Sons Ltd., ISBN 978-0-47069716-0, April 2009, sections 6 and 9.

Component Carrier Structure in LTE

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N_{RB}^{DL} \times N_{sc}^{RE}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In Carrier Aggregation (CA), two or more Component Carriers (CCs) are aggregated in order to support wider transmission bandwidths up to 100 MHz. Several carriers in the LTE system are aggregated into one wider channel in the LTE-Advanced system which is wide enough for 100 MHz, even though these carriers in LTE are in different frequency bands. On the aggregated wider channel, an LTE-Advanced user equipment can access several spectrum fragments simultaneously. Meanwhile, an LTE user equipment can access only one spectrum fragment of them, thus meeting the need for spectral compatibility as well as reducing the costs of bits.

All component carriers can be configured to be 3GPP LTE Release 8/9 compatible, at least when the aggregated numbers of component carriers in the uplink and the downlink are the same. This does not necessarily mean that all component carriers need to be compatible to 3GPP LTE (Release 8/9).

A user equipment may simultaneously receive or transmit on one or multiple component carriers. On how many component carriers simultaneous reception/transmission is possible, is depending on the capabilities of a user equipment.

A 3GPP LTE (Release 8/9) compatible user equipment can receive and transmit on a single CC only, provided that the structure of the CC follows the 3GPP LTE (Release 8/9) specifications, while a 3GPP LTE-A (Release 10) compatible user equipment with reception and/or transmission capabilities for carrier aggregation can simultaneously receive and/or transmit on multiple component carriers.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a UE with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the user equipment only has one RRC connection with the network. One cell—the special cell—provides the security input and the NAS mobility information (e.g. TAI). There is only one special cell per UE in connected mode.

At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected mode. Within the configured set of component carriers, other cells are referred to as Secondary Cells (SCells). The characteristics of the downlink and uplink PCell are:

The uplink PCell is used for transmission of Layer 1 uplink control information

The downlink PCell cannot be de-activated, unlike SCells

Re-establishment is triggered when the downlink PCell experiences Rayleigh fading (RLF), not when downlink SCells experience RLF The downlink PCell cell can change with handover Non-access stratum information is taken from the downlink PCell PCell can only be changed with handover procedure (i.e. with security key change and RACH procedure)

PCell is used for transmission of PUCCH

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signalling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

FIGS. 7 and 8 exemplarily show possible linkages between downlink and uplink component carriers. While in FIG. 7 all downlink component carriers are linked to the same uplink component carrier, in FIG. 8 downlink component carriers 1 and 2 are linked to uplink component carrier 1 and downlink component carrier 3 is linked to uplink component carrier 2.

LTE-A Support of Relaying Functionality

Relaying is considered for LTE-Advanced (Rel. 10 architecture) as a tool to improve e.g. the coverage of high data rates, group mobility, temporary network deployment, the cell-edge throughput and/or to provide coverage in new areas.

The relay node may be wirelessly connected to a radio-access network via a donor cell. The connection can be inband, in which case the network-to-relay link share the same band with direct network-to-user equipment links within the donor cell. Rel. 8 user equipments should be able to connect to the donor cell in this case.

outband, in which case the network-to-relay link does not operate in the same band as direct network-to-user equipment links within the donor cell.

With respect to the knowledge in the user equipment, relays can be classified into transparent, in which case the user equipment is not aware of whether or not it communicates with the network via the relay.

non-transparent, in which case the user equipment is aware of whether or not it is communicating with the network via the relay.

Depending on the relaying strategy, a relay may be part of the donor cell or may control cells of its own.

In the case the relay is part of the donor cell, the relay does not have a cell identity of its own (but may still have a relay ID. In this case, a relay should preferably support also LTE Rel. 8 user equipments. Smart repeaters, decode-and-forward relays and different types of L2 relays are examples of this type of relaying.

In the case the relay is in control of cells of its own, the relay controls one or several cells and a unique physical-layer cell identity is provided in each of the cells controlled by the relay. From a user equipment perspective there is no difference in accessing cells controlled by a relay and cells controlled by a "normal" eNodeB. The cells controlled by the relay should support also LTE Rel. 8 user equipments. Self-backhauling (L3 relay) uses this type of relaying.

In FIG. 9 and FIG. 10 an exemplary LTE-A system is shown which utilizes relay nodes (RN). The wireless interface between eNode B and RN, which connects a RN with the radio access network, is referred to as S1 interface.

Relay Backhaul Subframes

If the eNB-to-relay link operates in the same frequency spectrum as the relay-to-UE link, simultaneous eNB-to-relay and relay-to-UE transmissions on the same frequency resource may not be feasible unless sufficient isolation of the outgoing and incoming signals is provided due to the relay transmitter causing interference to its own receiver.

Therefore, when the relay node transmits data to the DeNB, it cannot receive data from UEs attached to the relay (r-UEs). Likewise, when the relay node receives data from the DeNB, it cannot transmit data to the r-UEs on the same frequency as shown in FIG. 10.

Thus, there is subframe partitioning between the relay backhaul link (eNB-to-relay link) and relay access link (relay-to-UE link). Currently it has been agreed that:

Relay backhaul DL subframes, during which DeNB-to-relay downlink backhaul transmissions may occur, are semi-statically assigned.

Relay backhaul UL subframes, during which relay-to-DeNB uplink backhaul transmissions may occur, are implicitly derived by HARQ timing from relay backhaul DL subframes.

In relay backhaul DL subframes, the relay node can receive from or transmit to (if it is scheduled 4 ms earlier) the DeNB, so r-UEs are not supposed to expect any relay transmission. In order to support backward compatibility for r-UEs, the relay node configures backhaul DL subframes as MBSFN subframe in relay.

MBSFN subframe can be configured for every 40 ms, so relay backhaul DL subframes also support 40 ms configuration. And the same as MBSFN subframe configuration, relay backhaul DL subframes of the SCell cannot be configured at subframes #0, #4, #5 and #9. Those subframes that are not allowed to be configured as backhaul DL subframes are called "illegal DL subframes" in the following.

Time-frequency resources shall be set aside for eNB-RN transmissions by time multiplexing eNB-RN and RN-UE transmissions. Subframes, during which eNB-RN transmissions may take place, are configured by higher layers. Downlink subframes configured for eNB-to-RN transmissions shall be configured as MBSFN subframes by the relay node. eNB-to-RN transmissions occur in downlink subframes and RN-to-eNB transmissions occur in uplink subframes. For frame structure type 1, eNB-to-RN and RN-to-UE transmissions occur in the downlink frequency band, while RN-to-eNB and UE-to-RN transmissions occur in the uplink frequency band.

For frame structure type 1, a subframe configured for eNB-to-RN transmission is a subframe satisfying $[(10 \cdot n_f + \lfloor n/2 \rfloor)] \mod 8] \in \Delta_{BSC}$ with the exception that a downlink subframe that cannot be configured as MBSFN subframe in the relay node cell shall not be configured for eNB-to-RN transmission. $n_f$ is the system frame number and $n_s$ is the slot number within a radio frame. The set $\Delta_{BSC}$ is determined as the union of the applicable offset values listed in the following Table with respect to the parameter SubframeConfigurationFDD, which is configured by higher layers, and where "x" means that the corresponding bit in the bitmap can be either 0 or 1.

| SubframeConfigurationFDD | Offset value element of $\Delta_{BSC}$ |
|---|---|
| {xxxxxxx1} | 7 |
| {xxxxxx1x} | 6 |
| {xxxxx1xx} | 5 |
| {xxxx1xxx} | 4 |
| {xxx1xxxx} | 3 |
| {xx1xxxxx} | 2 |
| {x1xxxxxx} | 1 |
| {1xxxxxxx} | 0 |

The above MBFSN configuration is standardized in TS 36.215, Chapter 5.2 (available at www.3gpp.org and incorporated herein by reference).

There are various MBSFN subframe configurations, according to which either 3, 6, 9, 12, 18, 21 or 24 subframes out of 40 subframes are configured for DL on the relay backhaul DL link. For instance, 3-out-of-40 subframes can be used by the DeNB to transmit data on the downlink over the backhaul link to the relay node. One particular configuration of the 3-out-of-40 configuration is to use the subframes #3, #11 and #27. Other subframes may be used as well, e.g. #2, #18 and #26. In this case, a roundtrip time of 8 ms (=8 subframes) is assumed, and therefore when starting at subframe #2, subframes #10 and #34 are not possible since these are illegal DL subframes, as explained above.

It is important to note that an inband relay, even if it cannot transmit and receive on the same frequency on the same subframe, it still can transmit control signalling to the UEs on the access link on the same frequency, on a subframe in which it receives a DL transmission. This is possible due to the gap created by the switching of the receiver to transmitter mode on the half-duplex relays. This gap is usually 2~3 OFDM symbols length and these are used to send control signalling to the UEs in the access link.

Though the following explanations for describing the underlying problem of the invention and for describing the various embodiments of the invention only relates to the 3-out-of-40 subframe configuration, the present invention is not restricted to this particular subframe configuration. Rather, any of the above-mentioned subframe configurations for MBSFN can be used, and the skilled person would easily apply the principles of the invention to the different subframe configurations.

Basic Scenario

FIG. 11 discloses a network scenario in which three relay nodes and two UEs are directly connected to a DeNB. Furthermore, several UEs are connected to relay node RN1. Before carrier aggregation, a serving cell is configured in the backhaul and one in the access link of the communication system. Initially, the relay nodes are operating in an outband mode, i.e. the carrier frequency of the serving cell used on the backhaul link (f2) is different from the carrier frequency of the serving cell used on the access link (f1). Correspondingly, the resources on the backhaul link (between DeNB and RNs) to RN1 are shared between the three relay nodes and the two UEs that are directly connected to the DeNB. The capacity of the resources for the UN link (also called backhaul link in the following) corresponds to the resources allocated to the RN1 out of the whole resources of the frequency band f2. On the other hand, the resources of the Uu link (between the relay node and the UEs, also called access link) are only shared between the UEs directly connected to RN1.

The access link has to handle much more control information than the backhaul link, since there is a one-to-many mapping on the downlink and a many-to-one mapping on the uplink for data and control information with respect to the relay node.

A significant increase of traffic on the Uu access link (f1) may put the backhaul link (f2) under stress. In particular, it may be assumed that the capacity of the backhaul link (f2) is 10 Mbps for RN1. The total capacity of the access link (f1) from RN1 is 20 Mbps. However, due to the backhaul link (f2) for RN1 being limited to 10 Mbps, traffic may be served only with 10 Mbps over the access link (f1) from RN1 to the attached UEs.

When the traffic coming down to the UEs attached to the RN1 increases to a critical point, the DeNB may decide to use carrier aggregation over the backhaul link. If the DeNB decides to use carrier aggregation due to the high amount of traffic, a secondary carrier over the backhaul link will be created (SCell). Assuming the SCell over the backhaul link has a capacity of 5 Mbps, the traffic which can be served after carrier aggregation increases from 10 Mbps (without carrier aggregation) to 15 Mbps (out of a total possible capacity of 20 Mbps).

This is depicted in FIG. 12, showing the SCell used over the backhaul link to the relay nodes, RN1, RN2 and RN3.

If the aggregated SCell uses a frequency that is the same as the carrier frequency used over the access link (f1), the operation of the relay node will be inband with regard to the SCell, while outband for the PCell. Correspondingly, the SCell will not affect the operation of the initial carrier (f2) over the backhaul link, which will then be used as the Primary carrier (PCell) in the carrier aggregation mode. In addition, UEs under the relay node 1 must continue to use the same frequency f1, in order to not force a handover.

It may become a quite common scenario for carrier aggregation that the SCell will have to use the same carrier frequency as the one used over the access link. The reason is that each operator can only use a certain limited number of frequency bands, and when aggregating a new carrier, it may be necessary to select the same carrier frequency for the SCell in the backhaul link as in the access link over the access link.

FIG. 13 depicts the subframes for the DeNB, RN and r-UE, and in the lower part the HARQ process IDs used by the r-UE to receive data in the particular subframe number. The DeNB and the RN are also configured for HARQ, wherein however the numbering of the HARQ process IDs is omitted in said respect. It can be assumed that the RN in communication with the r-UE uses the same HARQ processes, wherein communications between the relay node and the DeNB may or may not use different HARQ processes than over the access link (RN-r-UE). For instance, the relay node will also use HARQ process ID #4 for subframes 4, 12, 20 etc., the same as the r-UE.

The subframes are depicted for the PCell (f2) and the SCell (f1) after using carrier aggregation as explained above in connection with FIG. 12. As can be seen from FIG. 13, subframes 0, 4, 5, 9 of every radio frame are illegal DL subframes for the DL transmission over the backhaul link. In other words, though these subframes 0, 4, 5 and 9 may be used for UL in the backhaul (i.e. to receive data from the relay node) they cannot be used by the DeNB to transmit data to the relay node.

Based on the 3-out-of-40 subframe configuration explained above, the DeNB transmits the PDCCH to the relay node at subframe #3. The PDCCH for subframe #3 is assumed to include downlink data, but no UL grant for the relay node to transmit data back to the DeNB on the PUSCH (PDCCH is transmitted, but omitted from FIG. 13, subframe #3). With respect to the data, the relay node will transmit an ACK/NACK to the DeNB on the PUCCH in the PCell.

In subframe #11 the relay node receives a uplink grant from the DeNB, and thus a PUSCH transmission will be performed by the relay node in subframe #15 (#11+4 subframes by implicit configuration). Since the relay node uses subframe #15 for transmitting data to the DeNB on the SCell (f1), the relay node cannot receive data from the r-UEs on said carrier frequency f1. The subframe #15 is blocked for uplink transmissions from the r-UEs attached to said relay node.

Since the relay node does not receive an UL grant in subframe #3, the relay node will not perform an uplink transmission of data on the PUSCH over the Un interface in subframe #7. Therefore, subframe #7 will not be blocked for the SCell, and theoretically the subframe #7 could be used by the relay node to receive an uplink transmission from the r-UE.

Since the relay node receives data from the DeNB in subframe #3, it is not possible for the relay node to transmit data over the PDSCH to the r-UE in the same subframe of the SCell, because the relay node cannot switch from receiver to transmitter in the same subframe.

It is important to note that a relay node having an inband SCell, even if it cannot transmit and receive data (PDSCH, PUSCH) on the same frequency on the same subframe (as shown in FIG. 13, subframe #3), it still can transmit control signalling (i.e. PDCCH) on the same frequency on a subframe in which it receives a DL transmission. This is possible due to the gap created by the switching of the receiver to transmitter mode on the half-duplex relays. This gap usually has a length of 2-3 OFDM symbols, and these may be used to send control signalling to the UEs in the access link, including e.g. an UL grant for the r-UE.

Therefore, though the relay node cannot transmit data to the r-UE in subframe #3, it would still be possible to schedule the r-UE to perform an uplink transmission on subframe #7, using the first 3 OFDM symbols of subframe #3, as explained above. Furthermore, as explained above, subframe #7 would not be blocked on the SCell, since no PUSCH transmission is scheduled for the relay node, due to the missing UL grant in subframe #3.

However, transmitting an UL-grant from the relay node to the r-UE in subframe #3 is also not possible because the relay node needs to first decode the PDCCH it received from the DeNB on the backhaul link to determine whether the corresponding subframe #7 (#3+4 subframes) will be free or not. The relay node starts decoding subframe #3, which however takes longer than one subframe (1 ms). Hence, the relay node will miss the opportunity to schedule the UEs on the access link on the same subframe #3 for UL data on the subframe #7, even though subframe #7 in this scenario would not be blocked by a PUSCH transmission from the relay node to the DeNB.

In the downlink subframe #11, the DeNB transmits data on the PDSCH and an UL grant on the PDCCH. Upon receiving, the relay node starts decoding subframe #11, and thus will schedule a PUSCH transmission in subframe #15 (#11+4 subframes). Subframe #15 is only an illegal subframe for downlink; therefore, the DeNB may receive the PUSCH from the relay node in subframe #15.

Again, a downlink transmission from the relay node to the r-UE is not possible for subframe #11, since the relay node receives data in said subframe #13. Further, an UL grant for the UE would also not be transmitted from the relay node to the r-UE, because the subframe #15 is blocked to receive data from the r-UE of carrier f1 and because decoding of subframe #11 takes too long for the UL-grant to be transmitted to the r-UE in subframe #11.

In summary, in the present scenario in which the relay node operates inband for the SCell, typical inband problems arise, as just explained. For instance, not all subframes are available to send/receive on the access link due to subframe blocking, which limits the downlink and uplink data rates. Furthermore, even if the subframes are available, the relay node is not able to use them to schedule the r-UEs in the access link due to the time it takes the relay node to decode the UL grants in the DL assignments to determine in the first place if the subframe is available or not.

SUMMARY OF THE INVENTION

One object of the invention is to suggest a subframe configuration mechanism that mitigates one or more of the problems outlined above.

The object is solved by the subject matter of the independent claims. Advantageous embodiments of the invention are subject-matters of the dependent claims.

According to a first aspect of the invention, cross scheduling is used to mitigate the above problems. Cross scheduling allows scheduling the PUSCH on every possible subframe of the SCell. In particular, the UL grant is transmitted by the base station on the PDCCH of the PCell and correspondingly received by the relay node. The UL grant can be transmitted in any of the subframes, since the PCell is not restricted by the subframe configuration of the SCell that only allows certain subframes to be used for downlink transmissions from the DeNB to the relay node. In this case, the UL grant is transmitted in the PCell within a subframe that would not be possible for transmitting an uplink grant in the SCell. Correspondingly, the relay node may then use the UL grant to transmit the PUSCH on the subframe of the SCell which is 4 ms after the subframe with which the UL grant was received. In this case the other subframe is no longer blocked for receiving in the relay node the uplink transmission from the user equipment attached to the relay node. If the UE receives a corresponding UL grant, it may transmit data to the relay node in said un-blocked subframe.

The advantages provided thereby is that it allows freeing the subframes, normally blocked for relays operating in inband mode by the implicit subframe configuration (i.e. 4 subframes after UL grant). The UL subframe utilization is thus improved for the relay node. The above-explained cross scheduling allows decoupling the uplink and downlink subframes from one another since the uplink grant can be transmitted in any subframe from the DeNB not only in those specified by the subframe configuration of the SCell. Thus, a more flexible and asymmetric uplink and downlink allocation for the inband operation of the relay node is made possible.

According to a second aspect of the invention, the uplink shared channel (i.e. PUSCH) of the SCell is deactivated in order to avoid the problems of relay nodes operating in inband mode with the user equipments attached to the relay node, as will be explained in the following. The underlying scenario for applying the second aspect of the invention is that the channel between the base station and the relay node uses the same carrier frequency than the channel between the relay node and the attached user equipments, i.e. the relay node operates inband with respect to the user equipments. It is assumed that one SCell is aggregated between the base station and the relay node, which has the same carrier frequency than the channel between the relay node and the user equipments.

The uplink shared channel of the SCell is normally used by the relay node to transmit data to the base station (DeNB), according to uplink grants previously received from the base station. As discussed before, according to the implicit subframe configuration, 4 subframes after receiving an uplink grant, the relay node is scheduled to transmit data on the uplink shared channel to the base station. According to this implicit subframe configuration, the relay node needed to first decode a subframe to determine whether an uplink grant for the SCell was included or not to determine whether the subframe which is 4 subframes after the decoded subframe is used for an uplink transmission over the uplink shared channel of the SCell. If no uplink grant was included in said decoded subframe the subframe which is 4 subframes after the decoded subframe is free for receiving data from the user equipments attached to the relay node, in which case the user equipments could be scheduled to perform an uplink transmission to the relay node. As explained, after decoding said subframe, which takes longer than one subframe, the relay node misses the opportunity to schedule the user equipment(s) to transmit data to the relay node. The free subframe resource is thus not efficiently used.

According to the second aspect of the invention, by deactivating the uplink shared channel of the SCell in advance, the relay node knows that all subframes of the SCell can be used to either transmit data to the user equipments or receive data from the user equipments. No subframe of the SCell is blocked by uplink transmissions from the relay node to the base station. There is no need for the relay node to first decode a subframe so as to determine whether a subframe will be used for an uplink transmission to the base station, as done when using the implicit subframe configuration or the cross scheduling.

Correspondingly, the relay node can schedule on the SCell downlink transmissions to the user equipments and uplink transmission from the user equipments as necessary and without the limitations stemming from blocked subframes.

The uplink shared channel should not remain deactivated for ever, since in such a case the uplink bandwidth available for the relay node to transmit data to the base station is limited to the PCell only. Deactivating the uplink shared channel of the SCell allows increasing the traffic in both directions over the access link between the relay node and the user equipments.

Accordingly, the uplink shared channel should be activated again after being deactivated. This may be done by transmitting a message from the base station, or may be implemented by an expiry timer in the relay node after which the relay node automatically re-activates the uplink shared channel.

The deactivation/activation of the uplink shared channel of the SCell should be controlled dynamically, e.g. by the base station or the relay node depending on the necessities in the communication system. This allows an efficient use of the resources.

The present invention provides a method for dynamically configuring an uplink shared channel of a relay node in a communication system. The relay node is connected to a base station over a first communication link that includes a first component carrier using the carrier frequency f2 and a second component carrier using the carrier frequency f1. At least one user equipment is attached to the relay node over a second communication link using the carrier frequency f1. The base station dynamically instructs the relay node to deactivate/activate the uplink shared channel of the relay node for the second component carrier in pre-determined subframes.

According to an advantageous embodiment of the invention which can be used in addition or alternatively to the above, the step of instructing the relay node to deactivate/activate the uplink shared channel is based on traffic conditions in the first and second communication link.

According to an advantageous embodiment of the invention which can be used in addition or alternatively to the above one, the base station determines to deactivate the uplink shared channel of the relay node for the second component carrier by performing the following. Data traffic transmitted from the base station to the relay node is monitored and buffer status reports received from the relay node are monitored by the base station. A ratio between the data traffic and a value indicated in the buffer status reports is determined. In case the determined ratio is greater than a first pre-determined ratio, the step of deactivating the uplink shared channel of the relay node for the second component carrier in pre-determined subframes is performed.

In case the determined ratio is lower than a second pre-determined ratio, the step of activating the uplink shared channel of the relay node for the second component carrier in pre-determined subframes is performed.

According to an advantageous embodiment of the invention which can be used in addition or alternatively to the above ones, the deactivating/activating is instructed by transmitting a deactivation/activation message to the relay node.

According to an advantageous embodiment of the invention which can be used in addition or alternatively to the above ones, the deactivation/activation message is transmitted from the base station to the relay node using the first or second component carrier.

According to an advantageous embodiment of the invention which can be used in addition or alternatively to the above ones, the deactivation/activation message is transmitted within a control element of the media access control protocol layer.

According to an advantageous embodiment of the invention which can be used in addition or alternatively to the above ones, the deactivation/activation message is transmitted within an uplink grant message transmitted on the downlink control channel from the base station to the relay node.

According to an advantageous embodiment of the invention which can be used in addition or alternatively to the above ones, the deactivation/activation message is transmitted within a downlink assignment message transmitted on the downlink control channel from the base station to the relay node.

According to an advantageous embodiment of the invention which can be used in addition or alternatively to the above ones, the uplink grant message or the downlink assignment message is masked using a radio network temporary identifier, RNTI, common to all relay nodes connected to the base station. The uplink grant message or downlink assignment message comprises a relay node identifier, identifying the relay node.

According to an advantageous embodiment of the invention which can be used in addition or alternatively to the above ones, the uplink grant message or the downlink assignment message is masked using a radio network temporary identifier, RNTI, identifying the relay node.

According to an advantageous embodiment of the invention which can be used in addition or alternatively to the above ones, the deactivation/activation message comprises a component carrier identification to identify the second component carrier, which uplink shared channel is to be deactivated/activated in the pre-determined subframes.

According to an advantageous embodiment of the invention which can be used in addition or alternatively to the above ones, the uplink shared channel is deactivated/activated in all subframes of the second component carrier. This is done preferably by using a deactivation/activation flag.

According to an advantageous embodiment of the invention which can be used in addition or alternatively to the above ones, the uplink shared channel is deactivated/activated in a subset out of all subframes of the second component carrier. This is done preferably by being indicated by using a bitmap.

According to an advantageous embodiment of the invention which can be used in addition or alternatively to the above ones, those subframes in which the uplink shared channel will be deactivated are indicated by:
identifying the subframes in which the uplink shared channel is to be deactivated, or identifying the subframes in which the uplink shared channel is to remain active, or identifying processes of a hybrid automatic repeat request, HARQ, protocol associated with the subframes in which the uplink shared channel is to be deactivated, or identifying processes of a hybrid automatic repeat request, HARQ, protocol associated with the subframes in which the uplink shared channel is to remain active.

According to an advantageous embodiment of the invention which can be used in addition or alternatively to the above ones, the instruction to deactivate/activate the uplink shared channel of the relay node for the second component carrier includes a time delay parameter for the relay node to wait before deactivating/activating the uplink shared channel of the relay node for the second component carrier.

According to an advantageous embodiment of the invention which can be used in addition or alternatively to the above ones, the instruction to deactivate/activate the uplink shared channel of the relay node for the second component carrier includes an expiry parameter for the relay node to reverse the deactivating/activating of the uplink shared channel of the relay node for the second component carrier.

According to an advantageous embodiment of the invention which can be used in addition or alternatively to the above ones, the instruction to deactivate/activate the uplink shared channel of the relay node for the second component carrier includes information for defining a pattern of deactivation/activation periods to be repeatedly applied by the relay node.

According to an advantageous embodiment of the invention which can be used in addition or alternatively to the above ones, the relay node requests the base station to dynamically instruct the relay node to deactivate/activate the uplink shared channel of the relay node for the second component carrier, wherein the request to the base station is transmitted within a control element of the media access control protocol.

According to an advantageous embodiment of the invention which can be used in addition or alternatively to the above ones, the relay node decides to perform said request based on buffer status reports received from user equipments attached to the relay node.

The present invention further provides a base station for dynamically configuring an uplink shared channel of a relay node in a communication system. The relay node is connected to the base station over a first communication link that includes a first component carrier using the carrier frequency f2 and a second component carrier using the carrier frequency f1. At least one user equipment is attached to the relay node over a second communication link using the carrier frequency f1. A processor and transmitter of the base station dynamically instruct the relay node to deactivate/activate the uplink shared channel of the relay node for the second component carrier in pre-determined subframes.

According to an advantageous embodiment of the invention which can be used in addition or alternatively to the above ones, the processor monitors data traffic transmitted from the base station to the relay node and monitors buffer status reports received from the relay node. The processor determines a ratio between the data traffic and a value indicated in the buffer status reports. In case the determined ratio is greater than a first pre-determined ratio, the processor deactivates the uplink shared channel of the relay node for the second component carrier in pre-determined subframes. In case the determined ratio is lower than a second pre-determined ratio, the processor activates the uplink shared channel of the relay node for the second component carrier in pre-determined subframes.

According to an advantageous embodiment of the invention which can be used in addition or alternatively to the above ones, the transmitter of the base station transmits a deactivation/activation message to the relay node using the first or second component carrier for instructing the rely node to deactivate/activate the uplink shared channel of the relay node for the second component carrier in pre-determined subframes.

According to an advantageous embodiment of the invention which can be used in addition or alternatively to the above ones, the deactivation/activation message is transmitted within a control element of the media access control protocol layer, or within a downlink assignment message or an uplink grant message transmitted on the downlink control channel from the base station to the relay node.

According to an advantageous embodiment of the invention which can be used in addition or alternatively to the above ones, the processor of the base station masks the uplink grant message or the downlink assignment message using a radio network temporary identifier, RNTI, common to all relay nodes connected to the base station. The processor further includes a relay node identifier, identifying the relay node, into the uplink grant message or into the downlink assignment message.

According to an advantageous embodiment of the invention which can be used in addition or alternatively to the above ones, the processor of the base station masks the uplink grant message or the downlink assignment message using a radio network temporary identifier, RNTI, identifying the relay node.

According to an advantageous embodiment of the invention which can be used in addition or alternatively to the above ones, the processor includes a component carrier identification into the deactivation/activation message for identifying the second component carrier, which uplink shared channel is to be deactivate/activated in the pre-determined subframes.

According to an advantageous embodiment of the invention which can be used in addition or alternatively to the above ones, the processor decides upon deactivating/activating the uplink shared channel in all subframes of the second component carrier, or in a subset out of all subframes of the second component carrier.

According to an advantageous embodiment of the invention which can be used in addition or alternatively to the above ones, the processor includes a time delay parameter into the instruction to deactivate/activate the uplink shared channel of the relay node for the second component carrier, the time delay parameter being for the relay node to wait before deactivating/activating the uplink shared channel for the relay node for the second component carrier. Also the processor may include an expiry parameter for the relay node to reverse the deactivating/activating of the uplink shared channel of the relay node for the second component carrier. Also the processor may include information for defining a pattern of deactivation/activation periods to be repeatedly applied by the relay node.

According to an advantageous embodiment of the invention which can be used in addition or alternatively to the above ones, a receiver of the base station receives from the relay node a request to dynamically instruct the relay node to deactivate/activate the uplink shared channel of the relay node for the second component carrier.

The present invention further provides a relay node for dynamically configuring an uplink shared channel of the relay node in a communication system. The relay node is connected to a base station over a first communication link that includes a first component carrier using the carrier frequency f2 and a second component carrier using the carrier frequency f1. At least one user equipment is attached to the relay node over a second communication link using the carrier frequency f1. A processor of the relay node deactivates/activates the uplink shared channel of the relay node for the second component carrier in pre-determined subframes.

According to an advantageous embodiment of the invention which can be used in addition or alternatively to the above ones, the processor further monitors buffer status reports received from the user equipment to decide to request the base station to dynamically instruct the relay node to deactivate/activate the uplink shared channel of the relay node for the second component carrier, based on the monitored buffer status reports.

According to an advantageous embodiment of the invention which can be used in addition or alternatively to the above ones, a transmitter of the relay node transmits a deactivation/activation request message to the base station to request the base station to dynamically instruct the relay node to deactivate/activate the uplink shared channel of the relay node for the second component carrier. Preferably, the deactivation/activation request message is transmitted within a control element of the media access control protocol.

According to an advantageous embodiment of the invention which can be used in addition or alternatively to the above ones, the deactivation/activation request message includes information about which pre-determined subframes are to be deactivated/activated.

According to an advantageous embodiment of the invention which can be used in addition or alternatively to the above ones, a receiver of the relay node receives a deactivation/activation message. The processor deactivates/activates all or a subset out of all subframes of the second component carrier, based on information included in the received deactivation/activation message.

The present invention also provides a computer-readable medium storing instructions that, when executed by a processor of a user equipment, cause the base station to dynamically configure an uplink shared channel of a relay node in a communication system by performing steps of the previously discussed embodiments of the invention.

This will become clearer in connection with the embodiments of the invention explained in the detailed description.

BRIEF DESCRIPTION OF THE FIGURES

In the following, the invention is described in more detail in reference to the attached figures and drawings. Similar or corresponding details in the figures are marked with the same reference numerals.

FIG. 17 depicts a control element of the media access control protocol, for encoding the PUSCH deactivation command according to a further embodiment of the invention, FIG. 18 is a time diagram in which the timing of the PUSCH-deactivation command is illustrated according to one embodiment of the invention.

DETAILED DESCRIPTION OF THE INVENTION

Figure 1:
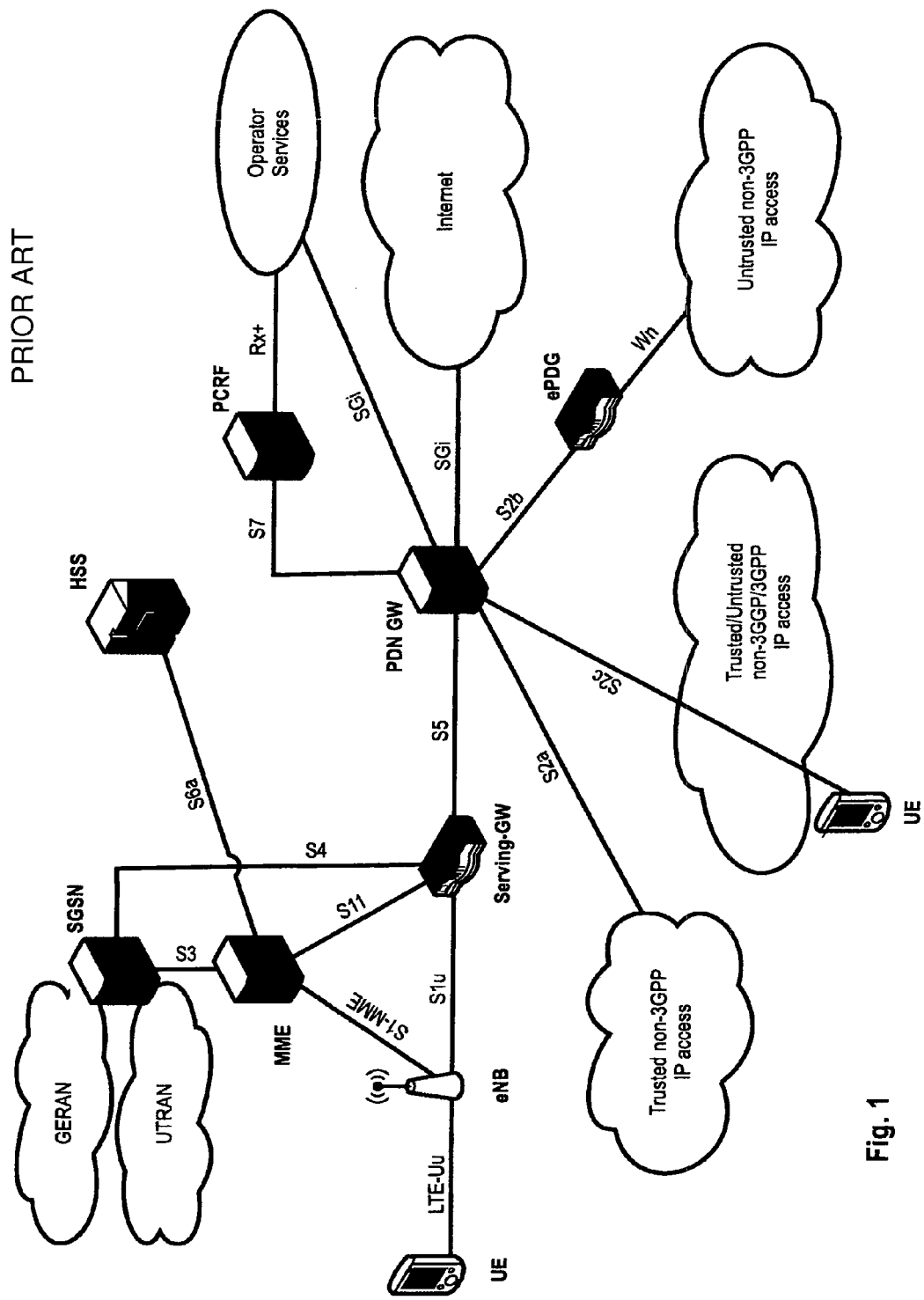
FIG. 1 shows an exemplary architecture of a 3GPP LTE system.
Figure 2:
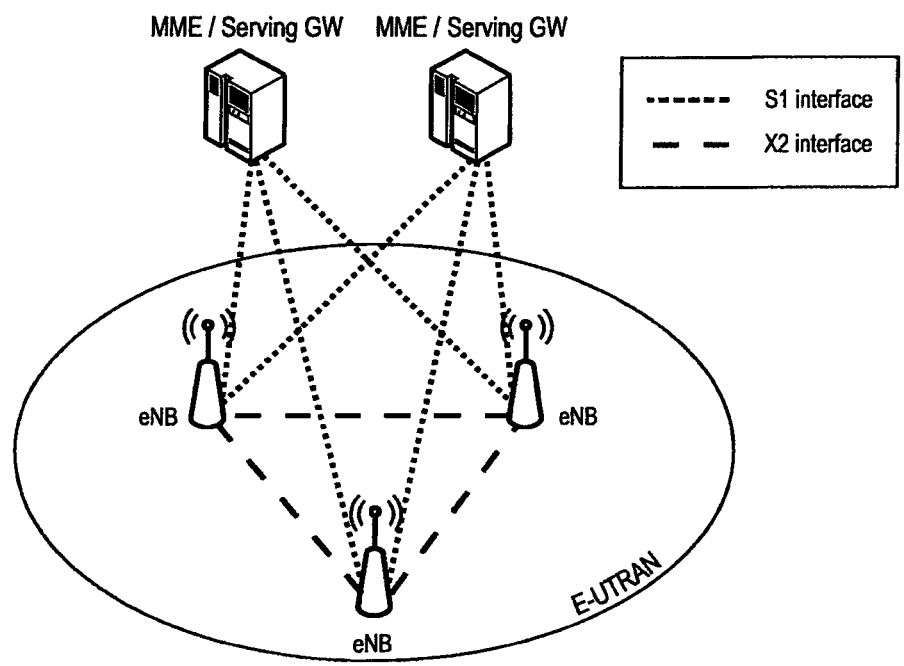
FIG. 2 shows an exemplary overview of the overall E-UTRAN architecture of 3GPP LTE.
Figure 3:
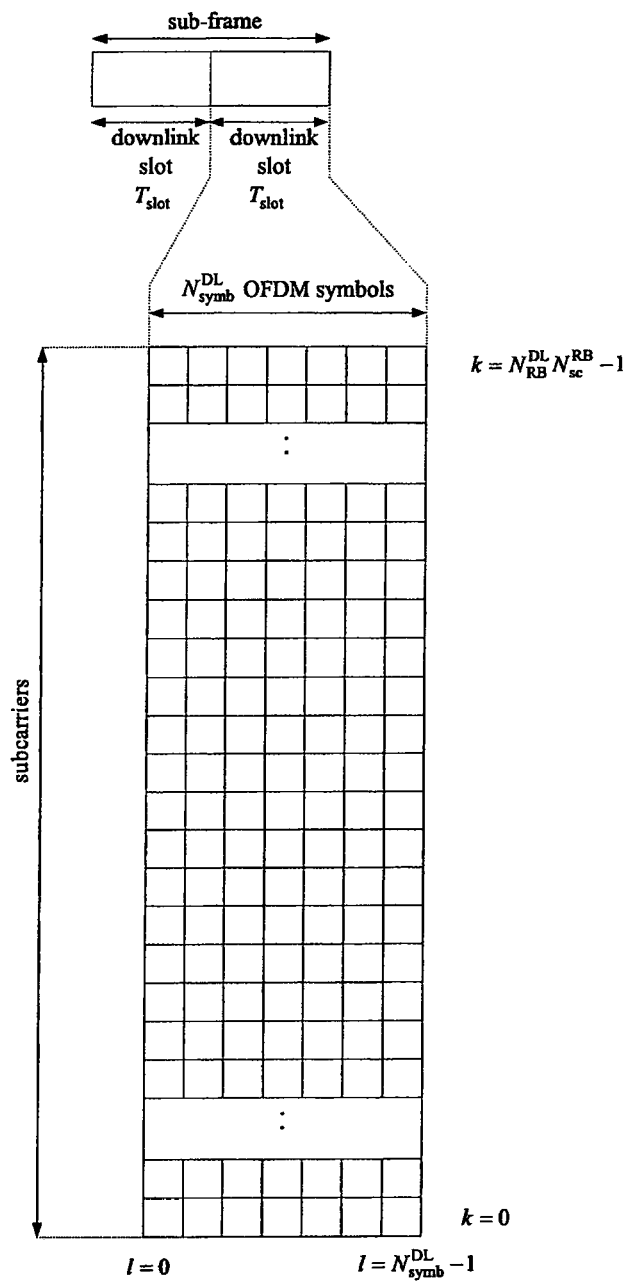
FIG. 3 shows an exemplary sub-frame structure on a downlink component carrier as defined for 3GPP LTE (Release 8/9)
Figure 4:
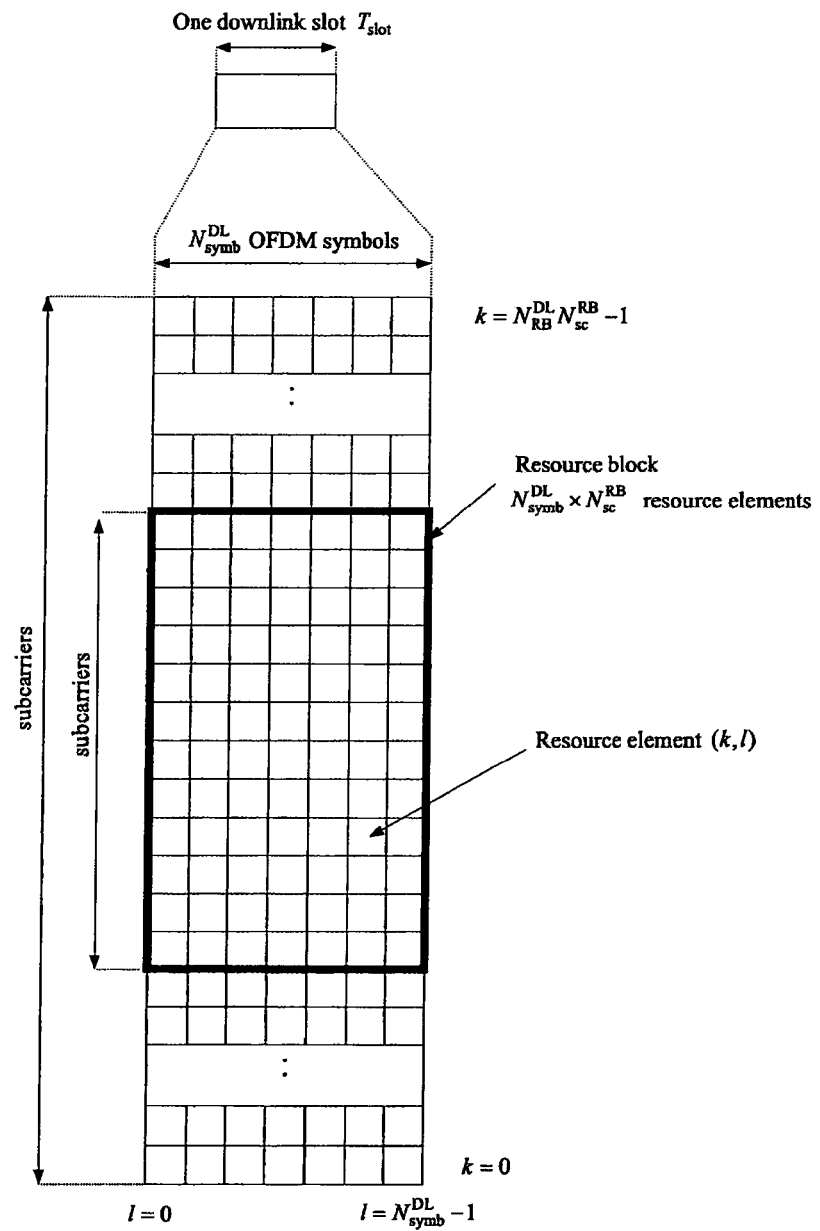
FIG. 4 shows an exemplary downlink resource grid of a downlink slot as defined for 3GPP LTE (Release 8/9)
Figure 5:
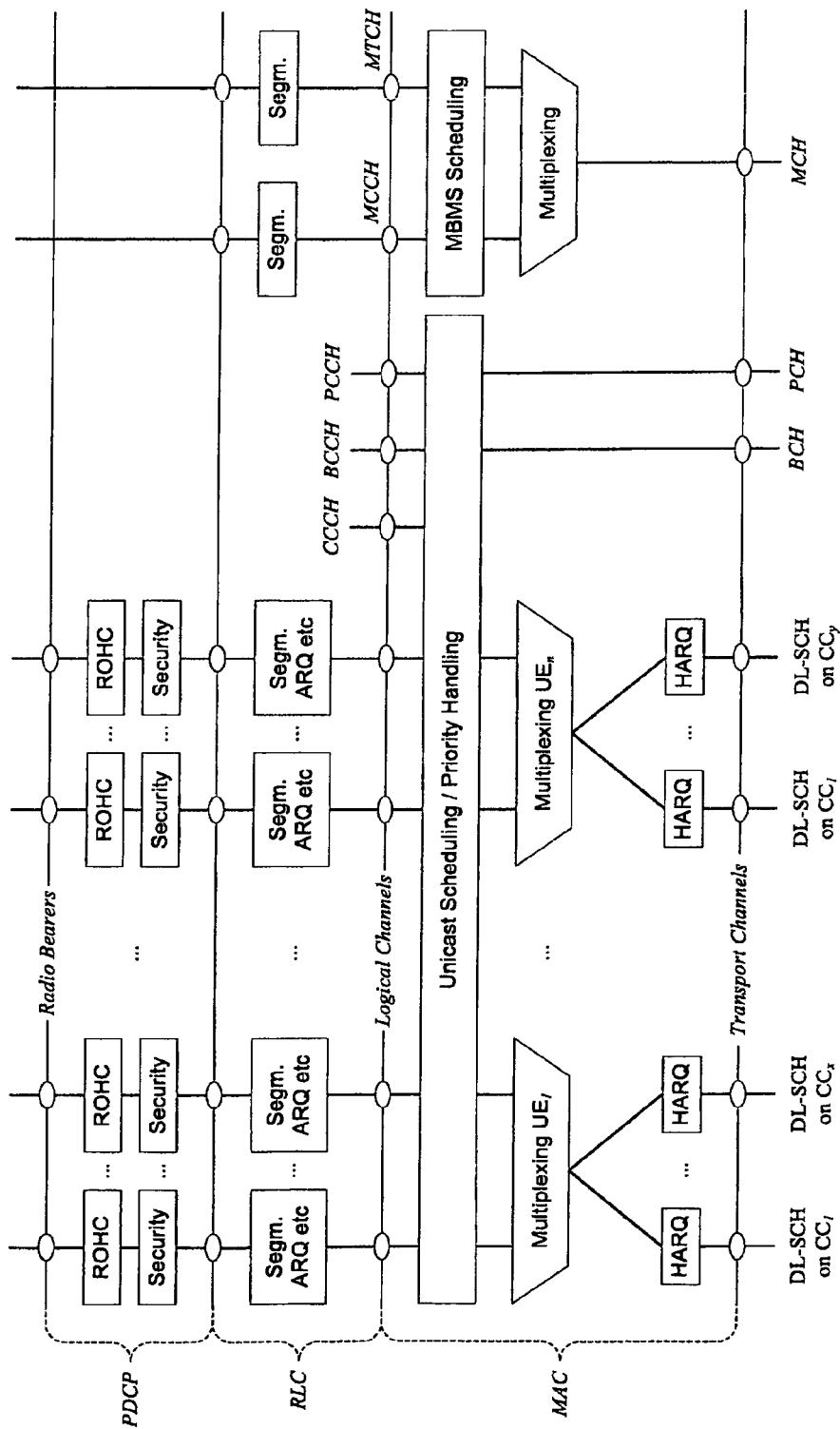
FIGS. 5 & 6 show the 3GPP LTE-A (Release 10) Layer 2 structure with activated carrier aggregation for the downlink and uplink, respectively.
Figure 6:
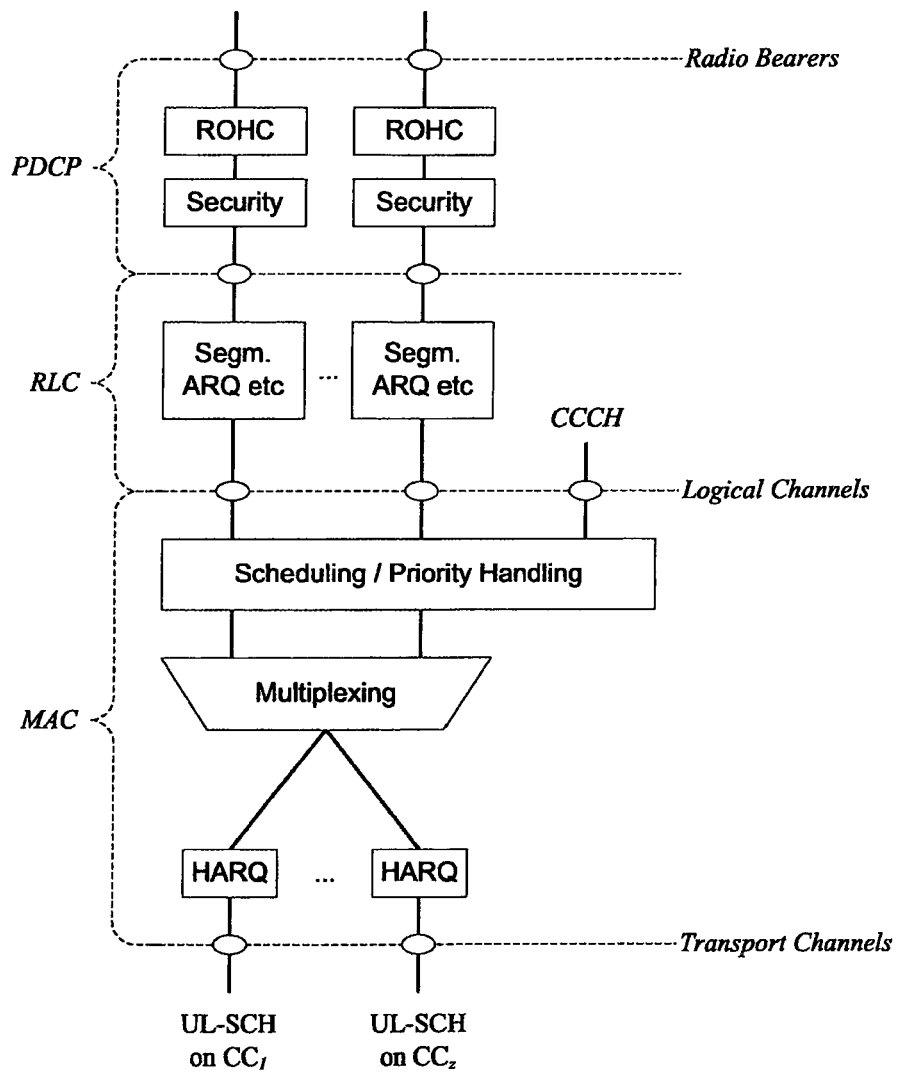
Figure 7:
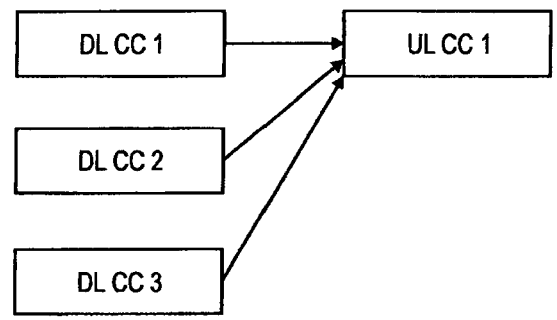
FIGS. 7 & 8 show exemplarily linkages between downlink and uplink component carriers in 3GPP LTE-A (Release 10)
Figure 8:
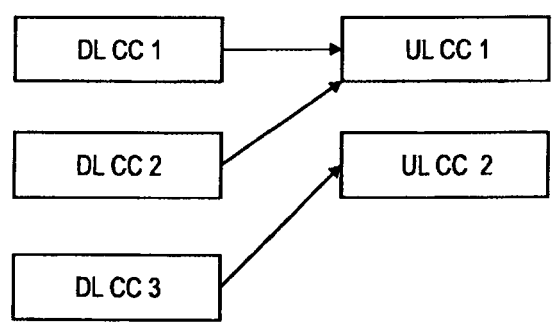
Figure 9:
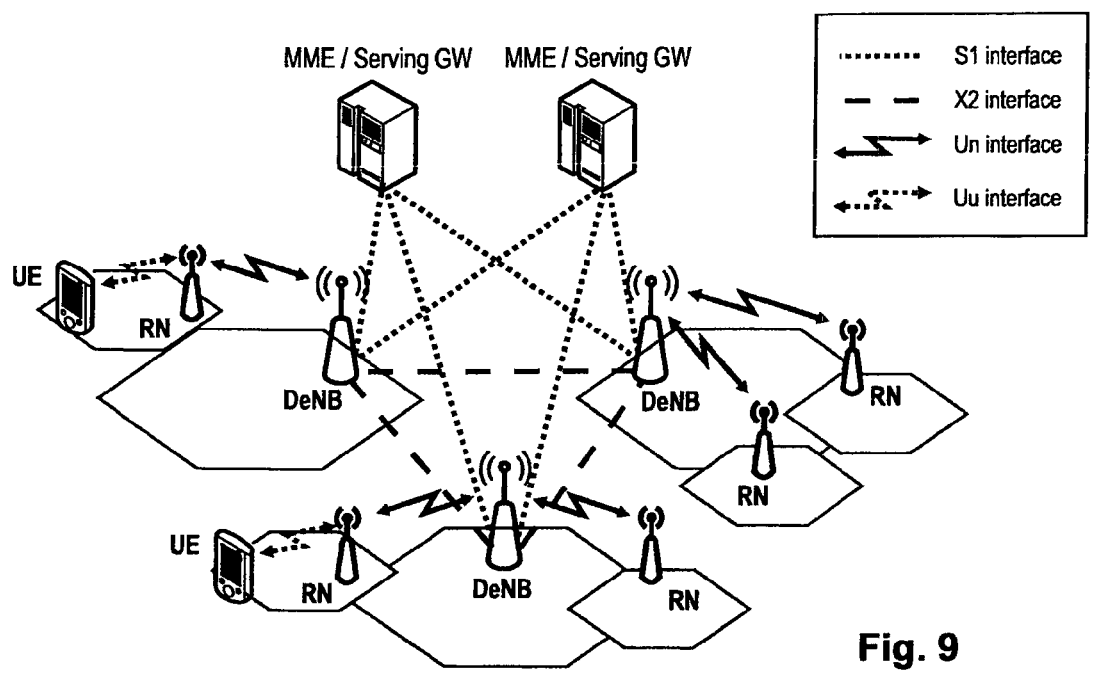
FIGS. 9 & 10 show an exemplary overview of the overall E-UTRAN architecture of LTE-A including several relay nodes (RN)
Figure 10:
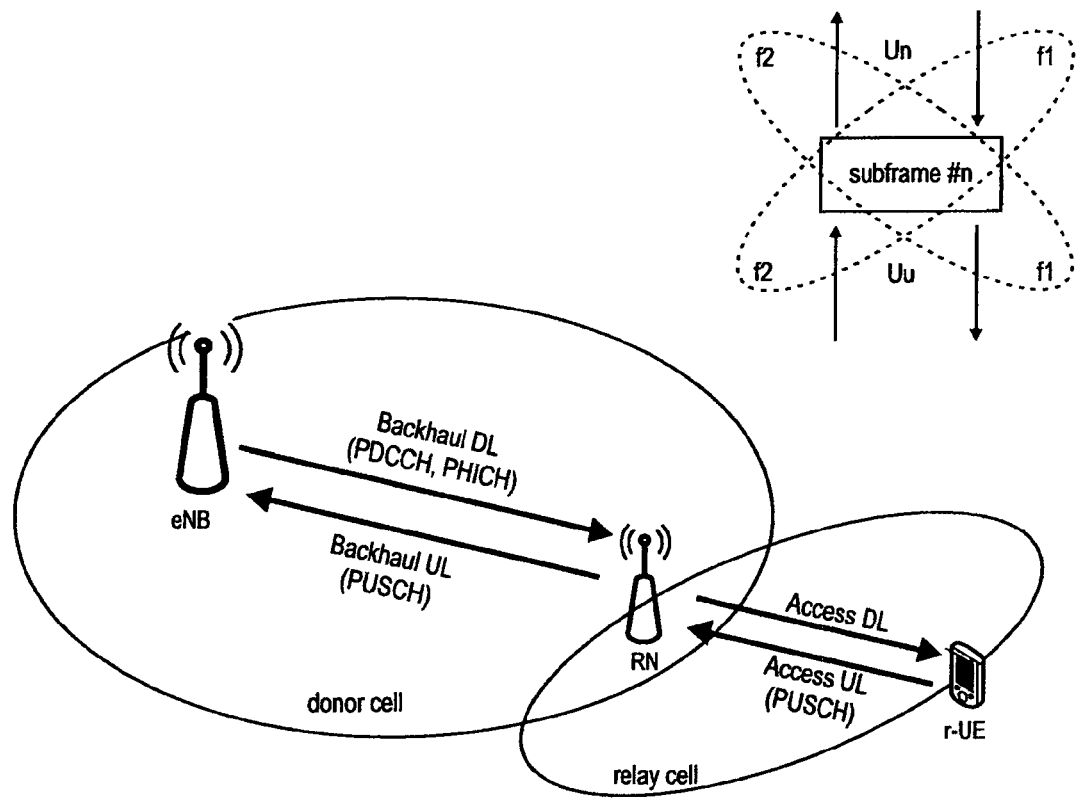
Figure 11:
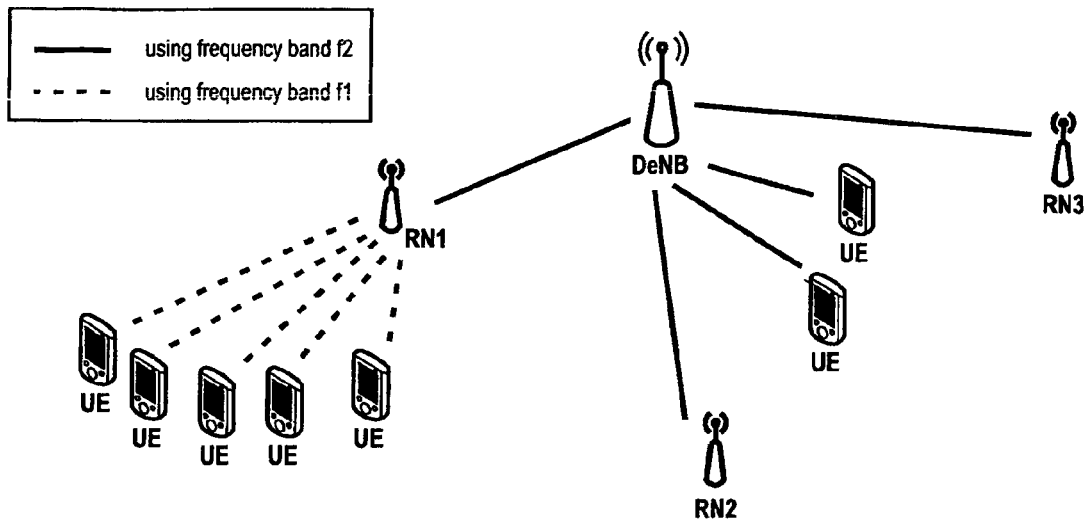
FIG. 11 shows a network scenario including several user equipments attached to a relay node RN1, wherein only one carrier with carrier frequency f2 is used over the backhaul link between DeNB and the relay node.

The following paragraphs will describe various embodiments of the invention. For exemplary purposes only, most of the embodiments are outlined in relation to the LTE-Advanced (LTE-A) mobile communication system discussed in the Technical Background section above. It should be noted that the invention may be advantageously used for example in connection with a mobile communication system such as the LTE-Advanced communication system previously described, but the invention is not limited to its use in this particular exemplary communication network.

The explanations given in the Technical Background section above are intended to better understand the mostly LTE-Advanced specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

The term "deactivation" as used in the present invention with respect to the PUSCH of an SCell and means that the uplink shared channel is no longer used for the SCell to which the deactivation refers. "Deactivation" as defined in the prior art refers to a component carrier as a whole, i.e. for downlink and uplink.

According to the "deactivation" of the present invention, no uplink resources will be scheduled by the DeNB for the relay node of that SCell, and the relay node thus knows that no uplink transmissions will be performed in the SCell to the DeNB. Put differently, a new configuration is defined for the SCell, namely a downlink-only configuration for certain or a subset of all subframes, in which the SCell will only be used for downlink but not for uplink.

Correspondingly, the term "activation" as used in the present invention also refers to the PUSCH of an SCell and means that the uplink shared channel is again used for the SCell which was previously deactivated. In other words, uplink resources can be scheduled by the DeNB for the relay node of that SCell, and the relay thus must determine whether an uplink transmission is scheduled in the SCell to the DeNB. Put differently, the original configuration is used again for the SCell, in which the SCell is used for both uplink and downlink.

The term "SCell" refers to an additional secondary carrier in a communication system for which carrier aggregation is performed in the backhaul link between the DeNB and the relay node. A "PCell" is the Primary carrier. An SCell or PCell may also be called "component carrier".

The present invention allows to mitigate the problems explained at the end of the background section, in particular that the uplink and downlink rates are limited due to the blocking of subframes for relay nodes operating in an inband configuration with the UEs.

Figure 13:
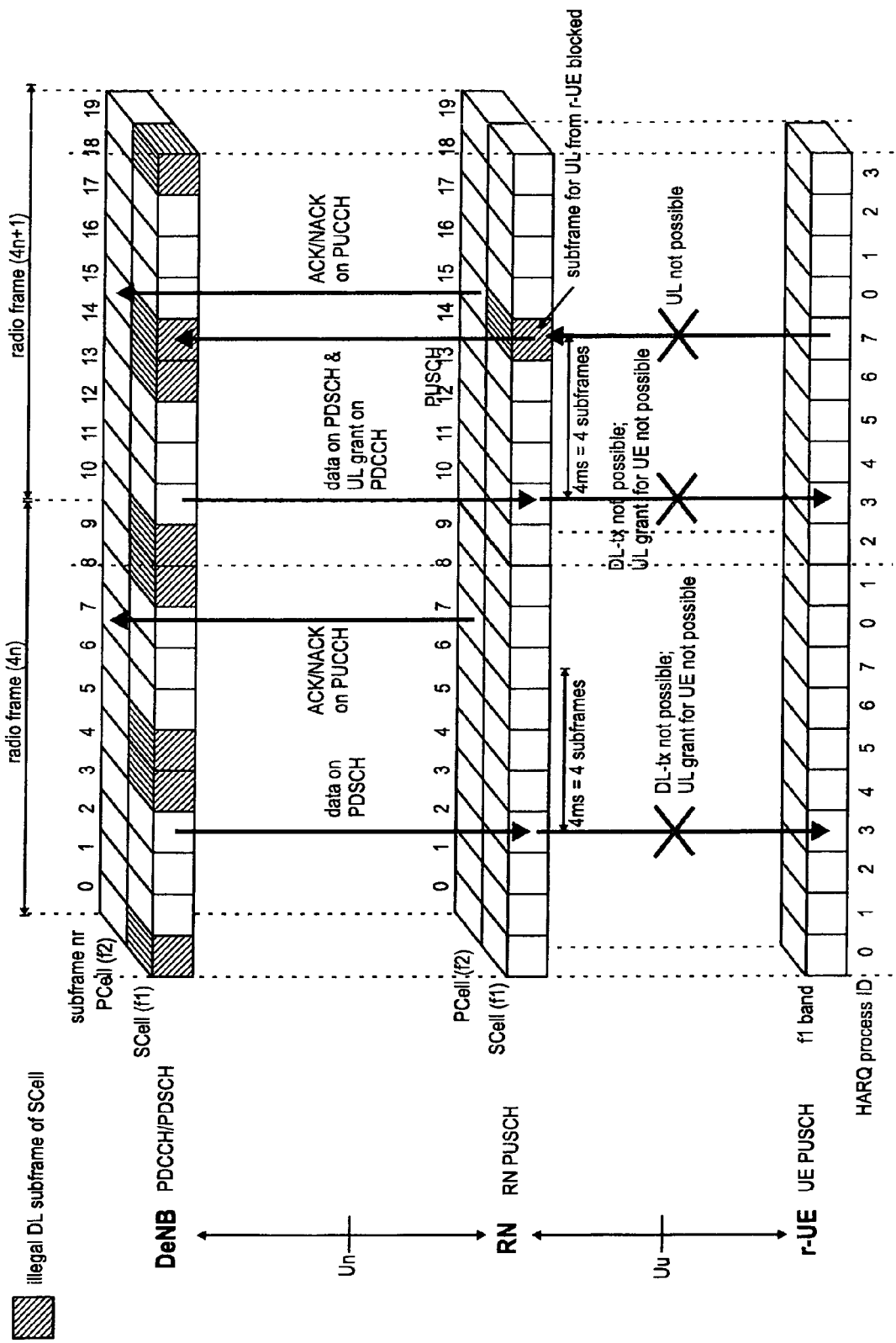
FIG. 13 is a diagram depicting the subframes on the communication links between the DeNB, relay node and user equipments, when applying the MBFSN subframe configuration.

According to a first aspect of the invention, cross scheduling is used by the DeNB to allow for a more flexible and asymmetric allocation of uplink resources for the relay node. This aspect will be explained in greater detail with reference to FIG. 14. It is assumed that a similar 3-out-of-40 subframe configuration is used as previously introduced for FIG. 13, i.e.

only subframes 3, 11 and 27 are usable for downlink transmissions from the DeNB to the relay node. Of course, other subframe configurations can be used as well.

Cross scheduling allows scheduling the relay node for an uplink transmission on every possible subframe, by using any of the possible subframes in the PCell and not only those that are configured by 3-out-of-40 subframe configuration on the SCell.

Figure 14:
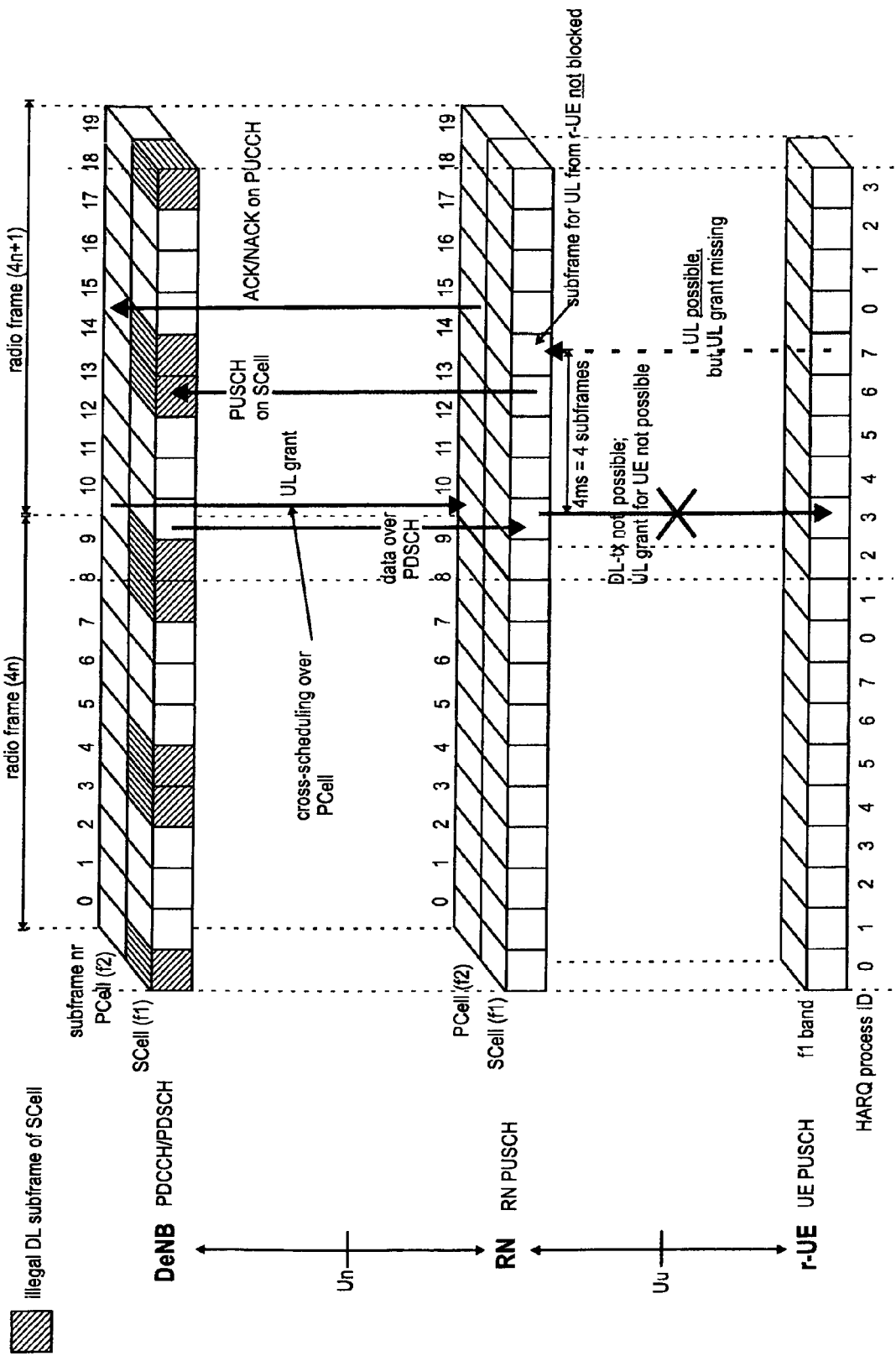
FIG. 14 is a diagram depicting the subframes on the communication links between the DeNB, relay node and user equipments, and in particular shows the effect of cross scheduling by the DeNB the relay node for transmitting the PUSCH.

As apparent from FIG. 14, the DeNB performs a cross scheduling by sending in subframe 10 of the PCell an uplink grant, including the carrier indication field identifying the SCell to which this cross scheduling refers. At subframe #11 of the SCell, the DeNB transmits data over the PDSCH to the relay node.

According to the received cross scheduling UL grant, the relay node identifies that it received an uplink grant for the SCell, based on the carrier identification field of the grant. Therefore, the relay node transmits data over the PUSCH in subframe #14 of the SCell (f1), i.e. using the subframe 4 ms after the subframe in which the uplink grant was received.

The data received by the relay node over PDSCH from the DeNB is acknowledged in subframe #15 on the PCell over the PUCCH, according to the implicit subframe configuration.

In view of the above, subframe #11 cannot be used for transmitting data on the downlink from the relay node to the r-UE because the relay node is receiving data on the SCell. Because of the cross-scheduling, subframe #15 is not blocked by the PUSCH transmission, which is sent instead in subframe #14 on the SCell. Therefore, uplink data from the r-UE could be received by the relay node in subframe #15.

However, the r-UE did not receive a corresponding UL grant from the relay node to perform an uplink transmission in subframe #15, for the reason that the decoding of the subframe #11 takes too long for the relay node to determine whether an UL grant is included in the PDCCH or not. Only if no UL grant for subframe #15 is included, subframe #15 would be free for the relay node to receive data from the r-UEs. The relay node would need to send an uplink grant to the r-UE in subframe #11 in order for the r-UE to transmit data over the PUSCH in subframe #15 according to the implicit subframe configuration (i.e. 4 subframes later).

Therefore, though subframe #15 of the SCell is not blocked by an uplink PUSCH transmission of the relay node, no r-UE is scheduled to transmit data in said subframe #15 to the relay node.

Figure 15:
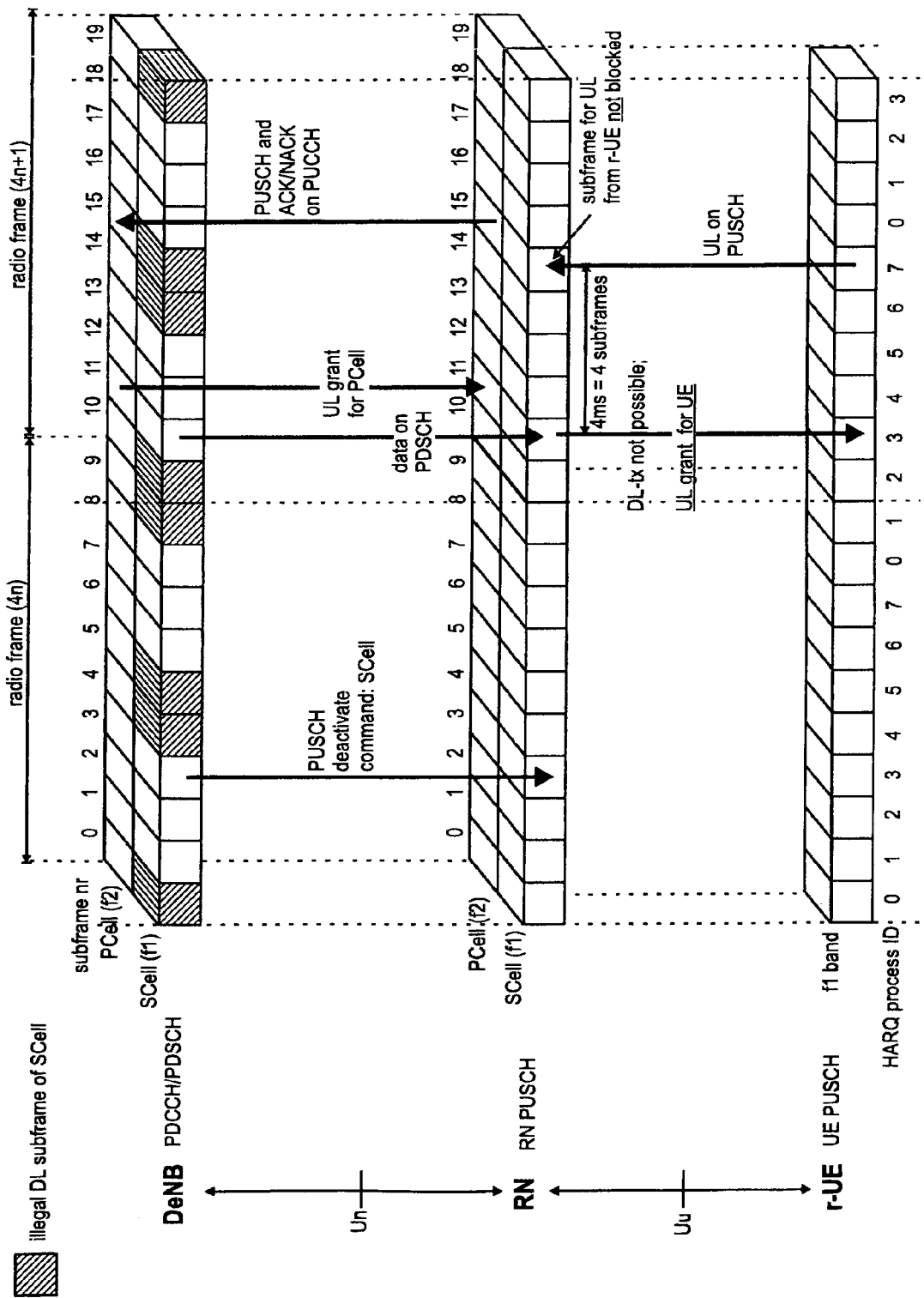
FIG. 15 is a diagram depicting the subframes on the communication links between the DeNB, relay node and user equipments, according to the second aspect of the invention, FIG. 16 discloses examples of a new DCI format for the PDCCH encoding the PUSCH deactivation command according to one embodiment of the invention.

According to an alternative second aspect of the invention, the PUSCH of the SCell is dynamically deactivated or activated. The second aspect of the invention will be explained in connection with FIG. 15, which assumes the same 3-out-of-40 subframe configuration as for FIGS. 14 and 13. Again, the 3-out-of-40 subframe configuration is only used for illustration purposes, and the principle of deactivating the PUSCH of the SCell can be applied to all of the possible subframe configurations.

It is decided that the PUSCH of the SCell is deactivated. The decision may be taken for example in the DeNB or the relay node. The decision may be taken based on various circumstances, such as traffic conditions in the backhaul and/or access link, or such as buffer status reports received in the relay node or DeNB. Which entity controls the deactivation/activation and based on which circumstances will be explained in detail further below.

For the moment, it is assumed that the DeNB decides to deactivate the PUSCH of the SCell for the relay node, and correspondingly transmits a PUSCH deactivate command to the relay node. Details as to how exactly the PUSCH deactivate command is transmitted to the relay node are also presented later.

It is also assumed for this exemplary scenario that the PUSCH is deactivated for all subframes of the SCell, though this is not necessary since also particular subframes may be selected for which the PUSCH is deactivated, e.g. the subframes that are downlink subframes according to the subframe configuration e.g. subframes #3, 11 and 27. Details in said respect will also be presented later.

It is assumed that the PUSCH deactivate command is transmitted in subframe #3 of the SCell, in concordance with the subframe configuration. The step of deactivating the PUSCH of the SCell is basically equivalent to instructing the relay node that it should not expect to receive an uplink grant for the SCell (e.g. for a given time). Upon receiving this instruction from the DeNB, the relay node knows that it will not be scheduled in uplink on the SCell, and the scheduler of the relay node can schedule the access link resources according to the necessities of the relay node and the user equipments for the access link. After decoding subframe #3, the relay node processes the PUSCH deactivate instruction for the SCell of the backhaul link. Correspondingly, the DeNB will not transmit any uplink grant to the relay node for resources of the SCell, and the relay node knows this.

The next downlink possibility in the backhaul link is in subframe #11, and the DeNB transmits data on the PDSCH to the relay node. According to the implicit subframe configuration, the data is acknowledged (ACK/NACK) in subframe #15 in the PCell over the PUCCH.

Because of receiving the PDSCH in subframe #11, the relay node cannot perform a downlink transmission over the access link to the user equipments. Nevertheless, since the relay node knows in advance that no uplink grant is scheduled in subframe #15 for the SCell to the DeNB, the relay node can schedule the user equipments to transmit data in the uplink of the SCell. Correspondingly, by transmitting a corresponding uplink grant in subframe #11 to the user equipments, the user equipments will perform an uplink transmission in subframe #15 according to the implicit subframe configuration (i.e. 4 subframes after received UL grant).

The uplink grant can be transmitted in the first 2-3 OFDM symbols of subframe #11 of the SCell to the r-UE, although the relay node is receiving data in the same subframe from the DeNB.

The data is received in the relay node in subframe #15 and can then be further transmitted to the DeNB. To said end, the PUSCH might not be transmitted in the SCell, since the PUSCH is deactivated in said respect. Instead, the DeNB schedules resources for the PUSCH in the PCell, and transmits a corresponding uplink grant to the relay node.

The DeNB transmits an uplink grant in subframe #11 to the relay node for the PCell, which allows the relay node to transmit data on the PUSCH in subframe #15 of the PCell. However, this uplink grant cannot be used for the uplink data received from the UE in subframe #15 of the SCell, since the decoding of the subframe takes too long to be forwarded in the same subframe.

Instead, the relay node needs to wait for the next uplink grant for transmitting the just received uplink data from the user equipment. The relay node may transmit a buffer status report in the PUSCH on the PCell (not depicted), which allows the DeNB to configure a corresponding uplink grant for the PCell, which is transmitted to the relay node in the next possible downlink subframe, which is subframe #27. Upon receiving that uplink grant from the DeNB in subframe #27, the relay node can transmit the uplink data, previously received in subframe #15 from the user equipment, to the DeNB in subframe #31 according to the implicit subframe configuration (#27+4 subframes).

In the following, the first aspect according to FIG. 14 is compared with the second aspect of the invention explained above with reference to FIG. 15. The cross scheduling allows to unblock subframe #15 of the SCell for receiving by the relay node uplink transmissions from the user equipments, since the PUSCH is transmitted in subframe #15 on the PCell instead on the SCell. This is the same as when deactivating the PUSCH on the SCell according to the second aspect of the invention.

However, for the first aspect of the invention, this unblocked subframe #15 cannot be scheduled in time by the relay node, because the relay node needs to first fully decode subframe #11 to determine the kind of uplink grant it received. In contrast thereto, according to the first aspect of the invention, the relay node knows in advance (i.e. even before starting to decode subframe #11) that no uplink data transmission will be performed in subframe #15 and can accordingly schedule the user equipments to perform an uplink transmission in subframe #15.

One advantage achieved by applying the principles of the second aspect is that the relay node may deliver more data to the user equipments attached to the relay node, since more subframes of the SCell can be used for said purpose. Put differently, all subframes of the SCell are free to be scheduled for downlink if the relay node decides to do so, whereas before deactivating the PUSCH of the SCell, some subframes of the SCell would be used for transmitting data to the DeNB, according to uplink grants scheduled by the DeNB.

A further advantage is that the user equipments attached to the relay node can deliver more data to the relay node, since more subframes of the SCell can be used for said purpose. In particular, no subframes are blocked by any PUSCH transmission on the SCell.

The advantages are even more significant if a 24-out-of-40 subframe configuration is configured for the backhaul link, since in said case more subframe blocking would occur. In particular, where in the 3-out-of-40 subframe configuration only 3 subframes out of all 40 subframes in four radio frames are blocked, in the other case it would be 24 subframes out of all 40 subframes of the four radio frames.

Figure 12:
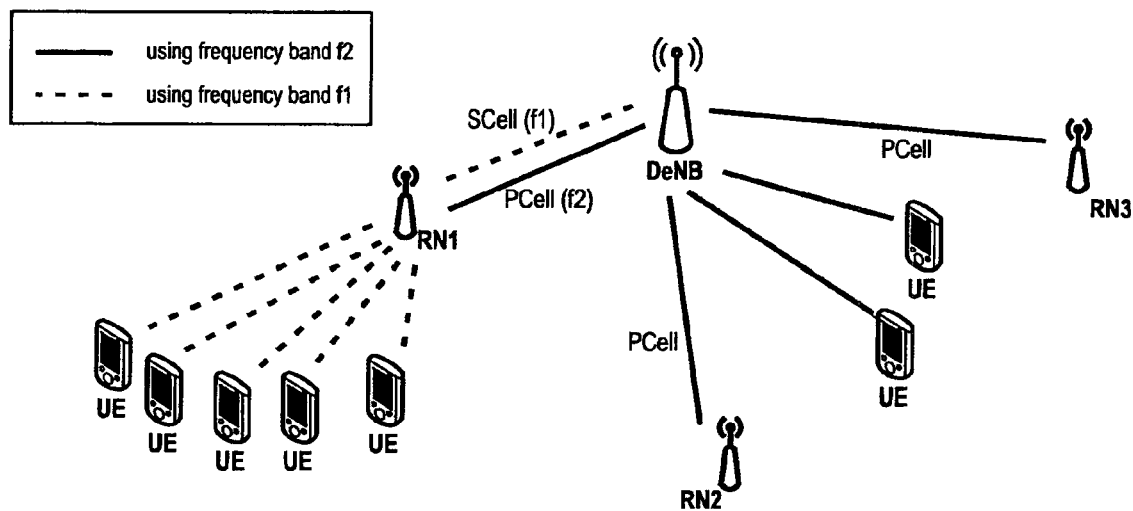
FIG. 12 shows a network scenario similar to the one of FIG. 11, wherein however the DeNB decided to use carrier aggregation, resulting in a PCell on carrier frequency f2 and an SCell on carrier frequency f1 over the backhaul link.

In the following, the above described second aspect of the invention will be explained in detail. For the various explanations the scenario as introduced in FIG. 12 is assumed, though the invention is of course not limited to said particular exemplary scenario.

The invention can be applied for example in all cases in which a relay node operates in inband mode with the user equipments, i.e. one SCell (out of a plurality of SCells) in the backhaul link has the same carrier frequency as the cell used in the access link between the relay node and the user equipments, attached to said relay node.

The present invention can also be applied for scenarios in which more than one SCell is operating in inband mode, e.g. when carrier aggregation is also used in the access link between the relay node and the UEs (when decided in further releases of the standard). Currently, only static relay nodes are standardized; the present invention does not only apply for static relay nodes, but in the future if relay nodes are mobile, the present invention may be applied as well.

Deciding to Perform PUSCH Deactivation

In the following, it will be discussed which entity and based on which criteria the decision can be taken to deactivate/activate the PUSCH of the SCell in the backhaul link.

Advantageously, the decision might be taken by either the DeNB or the relay node. In case the DeNB is the entity deciding on deactivating/activating the PUSCH, the decision has to be based on criteria known to the DeNB.

For instance, the DeNB is aware of the amount of traffic traversing the backhaul link to a particular relay node, by monitoring the buffers in the DeNB. The DeNB is usually not aware of the particular class of data, since the tunnel endpoint is usually the relay node, and no deep packet inspection is performed in the DeNB in said respect. The DeNB is further informed on the buffer status of the relay node via buffer status reports transmitted from the relay node to the DeNB on a regular basis or when high priority data is stored in the uplink buffers of the relay node.

In summary, the DeNB is aware of the downlink traffic directed to the relay node and thus to the user equipments attached to the relay node, and is further aware of the uplink traffic (from the user equipments) that is to be transmitted from the relay node to the DeNB via the buffer status reports.

Usually, if a lot of downlink traffic to the UEs is monitored by the DeNB, a corresponding amount of uplink traffic should be expected to be sent in the uplink from the UEs. For example, in case of Voice over IP applications, it may be expected that a similar amount of data should be transmitted in downlink and uplink. Furthermore, the downlink data may be streaming data, in which case no corresponding uplink data is necessary; however, streaming data has to be acknowledged and thus a lot of TCP ACK/NACKs are to be transmitted in the PUSCH from the user equipments to the core network.

Therefore, when a particular amount of downlink data is transmitted to the user equipments over the relay node, it can be expected that an amount of uplink data is present, the amount of uplink data corresponding to the amount of downlink data with a particular ratio. However, since the relay node operates in inband mode with the user equipments, this might lead to a lot blocking of subframes, thus reducing the downlink and uplink data rate in the access link.

This blocking of subframes as explained at the end of the background section might create a discrepancy between the amount of downlink data that is actually transmitted from the DeNB towards the user equipments and the amount of uplink data that is actually transmitted from the relay node to the DeNB.

This discrepancy can be identified by monitoring the downlink traffic traversing the DeNB, and monitoring the uplink traffic from the relay node, e.g. via the buffer status reports reported by the relay node.

A particular ratio can be pre-determined between the amount of downlink traffic and the uplink traffic, as indicated by a value of the buffers status reports. The pre-determined ratio can be used to decide whether to deactivate the SCell or not. To said end, the DeNB monitors the downlink traffic and the uplink traffic, and continuously calculates a ratio that reflects that current conditions. The calculated ratio is compared against the pre-determined ratio, and if the comparison is positive, then the DeNB decides to deactivate the PUSCH of the SCell.

In more detail, according to an exemplary embodiment only the amount of downlink and uplink traffic is monitored, and the ratio is defined as the downlink traffic divided by the uplink traffic. If the current ratio is larger than the pre-determined ratio, then less uplink data is transmitted in the backhaul link than downlink data. This is understood as an indication to increase the uplink data rate in the access link, and the DeNB decides to transmit a PUSCH-deactivation command to the relay node.

Conversely, the DeNB proceeds similarly in order to reactivate the PUSCH of the SCell in the relay node. A second pre-determined ratio can be defined which is constantly compared to the current ratio. If the current ratio is smaller than the second pre-determined ratio, this means that more uplink data is transmitted than could be expected from the amount of downlink data in the backhaul link. Therefore, if the PUSCH of the SCell of the relay node is deactivated, DeNB decides to transmit the PUSCH-activation command to the relay node, when the current ratio falls below the pre-determined second ratio.

The above-explained use of data traffic for calculating the ratios is but an example on how the DeNB could decide to deactivate/activate the PUSCH of the SCell in the relay node depending on the necessities of the communication system.

Another method for allowing the DeNB to decide on deactivating the PUSCH of the SCell could be based on the mechanisms utilized for interference management among network nodes. In such interference management method a periodic message exchange is performed between network nodes using the X2 interface signaling, in the present scenario the DeNB and the RN. Since in the present scenario the DeNB has increased the amount of traffic to the RN by means of carrier aggregation, the DeNB can be made aware of the downlink transmissions of the RN by means of the so called Relative Narrowband Transmit Power indicator (RNTP) on the interference management mechanism. This RNTP is a bitmap used to inform neighbour entities if the RN is planning to keep the transmit power for the SCell resource blocks below a certain upper limit (each bit of the RNTP indicator corresponds to a resource block in frequency domain). The value of this upper limit is configurable as well as the duration for which it is valid. In the present scenario the higher the value of the upper limit, the more UEs that are scheduled for DL assignments by the RN. Since the RN needs to unload all the traffic received from DeNB to the r-UEs, a high level of DL transmission power indicated on the RNTP for certain or all RBs will indicate to the DeNB that the RN has a lot of DL traffic. In addition to that, for the UL transmissions on the access link (UEs->RN), the RN could utilize the High Interference Indicator (HII) to inform the DeNB and other network nodes that it will in the near future schedule UEs in certain parts of the bandwidth and that interference may occur. This information can in turn be used by the DeNB to determine that PUSCH for the corresponding SCell needs to be deactivated so the RN can actually schedule those UEs on the UL and in turn decide to send the PUSCH deactivation command for the SCell.

In case the relay node decides on when to deactivate the PUSCH, a similar decision finding process can be implemented as for the DeNB. The relay node is aware of the downlink and uplink data traffic over the access link through its own buffers and the buffer status reports received from the UEs. Correspondingly, this information can be used by the relay node to decide if it would be advantageous for resource utilization to deactivate or re-activate the PUSCH for the SCell of the relay node.

When the relay node decides for PUSCH-deactivation, a PUSCH-deactivation request message is transmitted to the DeNB to instruct the DeNB to transmit the PUSCH-deactivation command back to the relay node. The PUSCH-deactivation request message can be encoded within a MAC CE as done with the PUSCH-deactivation command.

Alternatively, the relay node could merely inform the DeNB about its decision to deactivate the PUSCH of its SCell. The DeNB thus knows that it should not schedule any uplink resources for the PUSCH of the SCell, and does not need to transmit the PUSCH-deactivation command. The relay node also does not need to wait for the PUSCH-deactivation command.

However, this is not absolutely necessary; the relay node might decide to deactivate its own PUSCH for the SCell and performs the deactivation without instructing the DeNB and receiving the corresponding PUSCH deactivation command from the DeNB. Corresponding uplink grants received from the DeNB for the SCell would then be ignored.

Relay node should inform the DeNB, because otherwise the DeNB would not be aware of the deactivation of the PUSCH on the SCell of the relay node, and would try to schedule uplink transmissions on the SCell which would then be ignored by the relay node. The thus scheduled uplink resources would be lost.

How to Transmit PUSCH Deactivation

The PUSCH deactivation command can be transmitted e.g. within the R-PDCCH of the SCell (e.g. as a downlink assignment or an uplink grant), the PDCCH of the PCell (such as a downlink assignment or an uplink grant) or within a MAC control element. These are only some examples of the possibilities and will be explained now in more detail.

The deactivation of the data uplink on the SCell can be realized by sending the PUSCH deactivation command to the relay node using an R-PDCCH that is sent in the SCell. If more than one SCell is available in the backhaul link, the R-PDCCH can be transmitted in any of the SCells. However, if the command is not transmitted in the SCell that is to be deactivated, an SCell identification can indicate the SCell which PUSCH is to be deactivated. This SCell identification may be e.g. the carrier identification field (CIF), as known from the standard.

The PUSCH deactivation command can also be transmitted on the PCell by using a PDCCH format, in which case an SCell identification could be included as well in case more than one SCell is configured in the backhaul link.

In either case (R-PDCCH or PDCCH), the content of the R-PDCCH/PDCCH can be one of an already existing DCI format so as to avoid blind decoding of the R-PDCCH respectively PDCCH. In the following exemplary embodiment of the invention the DCI formats 0 (Uplink grant) and 1A (downlink assignment) are explained in greater detail for being used to encode the PUSCH-deactivation command. In other words, the PUSCH-deactivation command can be transmitted from the DeNB to the relay node within a downlink assignment or an uplink grant signaling of the R-PDCCH of an SCell or the PDCCH of the PCell.

However, the use of the DCI format 0 or 1A should be understood as an advantageous example. The skilled person is aware that any other suitable known or new format can be used to comprise the PUSCH-deactivation command.

FIG. 16 discloses signals of the standardized DCI format 0 and 1A, and in addition some possibilities on how to implement the PUSCH-deactivation message using the DCI format 0 or 1A (marked as "new"). The signals depicted in FIG. 16 are the same for both the R-PDCCH and the PDCCH. It should be noted that the newly defined payloads marked as new1, 2 and 3, refer to any of the formats depicted above in FIG. 16 for the different bandwidths. In other words, the content as depicted in FIG. 16 in either of the new format is adapted to the particular bandwidth, i.e. comprises 21-28 bits depending on the bandwidth.

As apparent from FIG. 16, the DCI format 0 and 1A signals are different depending on the bandwidth. In particular, the resource blocks assignment field (RBA) includes more bits with increasing bandwidth. The DCI format 0 and 1A can have min 21 bits and max 28 bits (without CRC added for all the available bandwidths), according to current standardization.

The bits of the DCI format 0 and 1A signal are used to encode the PUSCH-deactivation command message. The content of the DCI formats depends on what RNTI is used to mark the PDCCH (or R-PDCCH). For instance, one option would be to use a common RNTI that is configured for all relay nodes connected to the DeNB to mask the PDCCH or R-PDCCH. In said case, if the PUSCH-deactivation command is not intended for all relay nodes, the DCI format 0/1A payload would furthermore contain a relay node identifier, such as the RN Cell-RNTI or the IMSI (International Mobile Subscriber Identity) or a Temporary-IMSI (TIMSI), to individually identify the relay node which should apply the deactivation of the PUSCH of the SCell. This refers to the DCI format 0 or 1A marked as new 1 and new 2.

Another approach would be to use a specific RN C-RNTI to mask the PDCCH or R-PDCCH. In said case, the DCI format 0 or 1A payload need not include a further relay node identifier, since only that relay node is able to decode the R-PDCCH or PDCCH without error to which the RN C-RNTI used for masking corresponds. In said case, more bits of the DCI format 0 or 1A can be used for encoding the PUSCH-deactivation command message. This embodiment refers to the DCI format 0 or 1A marked as new 3, where no relay node identifier is included.

By using a common C-RNTI instead of individual C-RNTIs, less RNTIs are used for configuration (if the relay node identifier is not an individual C-RNTI); this however reduces the usable bits of the DCI format 0 or 1A since a relay node identifier is included to be able to individually instruct particular relay nodes.

The PUSCH-deactivation command may further contain a component carrier ID, to identify the SCell, which PUSCH is to be deactivated. This may be necessary to make sure that the relay node applies the command to the correct SCell. For instance, if there are several SCell configured in the backhaul of the communication system and the PUSCH-deactivation command is received in the PDCCH of the PCell or the R-PDCCH of another SCell, a target CC ID field (such as an CIF) may be included in the PUSCH-deactivation command. This is depicted for the DCI format 0 or 1A marked as new1. Those formats marked as new2 and new3 do not contain the carrier identification field, therefore might be understood to refer to signals transmitted in the particular SCell which PUSCH is to be deactivated, since then no separate indication for identifying the SCell is necessary. This applies similarly to the case where only one SCell is configured and the PUCSCH-deactivation command is received via the PCell.

The PUSCH-deactivation command includes a field indicating what exactly is to be deactivated. There are several possibilities on how to encode the command as to what exactly is to be deactivated. For example, it is possible to deactivate the PUSCH for all subframes of the SCell. In this case, a 1-bit flag might be used as an exemplary implementation. For example, in case the 1-bit flag is on (i.e. bit=1), the PUSCH is deactivated for the SCell. Conversely, in case the 1-bit flag is off (i.e. bit=0), the PUSCH is activated again for the SCell (PUSCH re-activation will be explained later in more detail).

However, the PUSCH may also be deactivated only for a subset of all the subframes or only for individual subframes. In said case, a flag is not sufficient. To reliably identify those subframes for which the PUSCH is to be deactivated, a bitmap with 10 bits can be used. Each bit of the 10-bit bitmap refers to one subframe out of the 10 subframes of one radio frame. The bitmap thus identifies those subframes within a radio frame for which the relay node should not expect an uplink grant for the PUSCH in the SCell. Then, this configuration given by the bitmap is applied in each radio frame until otherwise instructed.

Conversely, the bitmap might also identify those subframes within a radio frame for which the PUSCH is not deactivated, i.e. remains active. Thus, the bitmap implicitly indicates those subframes for which the PUSCH is to be deactivated.

The bitmap might alternatively identify the HARQ processes instead of the subframes. According to the current standardization, 8 HARQ processes are configured for each component carrier, and the bitmap may include 8 bits to either identify those HARQ processes that remain active or inactive for the PUSCH of the SCell.

The use of a flag to deactivate/active the PUSCH for all subframes of the SCell is easy to implement and reduces control signaling, however lacks flexibility and might reduce the resource utilization. By using a bitmap or similar to individually deactivate the PUSCH for particular subframes or subset of subframes, the embodiment is more flexible and thus could be used to reserve subframes/HARQ processes for particular application running on the relay node.

The relay node may distinguish the PUSCH-deactivation command included in an existing format of a normal DCI format 0 or 1A from a normal DCI format 0 and 1A, i.e. an uplink grant or downlink assignment, by means of its payload. The signalling in the form a DCI format will be mapped on the same place as the DL assignment or UL grant in the (R) PDCCH after the CRC de-masking. The relay node will have to try to decode as well for a possible non-scheduling command in case carrier aggregation is configured and there is at least one SCell activated.

Another approach may be to send a not-valid combination of the resource blocks assignment field for the uplink grant, and then use the front bits for the information as to which subframes are deactivated (e.g. bitmap), when there is the need to address just one specific HARQ process.

As explained before, the PUSCH-deactivation command may also be encoded within a MAC control element. FIG. 17 shows the format of such a control element of the MAC protocol. The format of such a MAC CE of course depends on the content of the PUSCH-deactivation message, e.g. whether it includes a flag or a 8-bit/10-bit bitmap. In one possible embodiment, the DeNB will use a MAC CE that is similar to the MAC CE which is used for component carrier activation/deactivation, with an extended field for identifying the subframes/HARQ process IDs that are affected. The MAC CE with the most significant bit R is used to indicate the PUSCH deactivation (e.g. R=1). Furthermore, the SCell is to be identified with the 7-bit field already standardized for the MAC CE for CC activation/deactivation. Correspondingly, the CE also comprises a 8-10 bit field for instructing the relay node for what exactly (subframes or HARQ processes) the PUSCH is actually deactivated.

The control element depicted in FIG. 17 is only an example, and any other control element might be used for purposes of encoding the PUSCH-deactivation command.

Using the PDCCH, R-PDCCH or a MAC CE yields different benefits as will be explained in the following. Using a PDCCH or R-PDCCH has the benefit that the execution of the command is quicker since there is no need to acknowledge the reception of (R)-PDCCHs, thus saving time. Using a MAC CE has the advantage of being more reliable since the MAC CE is acknowledged communication. Therefore, the possibility of errors at implementing the command is much lower than with PDCCH. In addition, since the scheduling is done on the MAC layer, there is no need to have interactions with the physical layer at the time of issuing the PUSCH-deactivation command. Finally, a further advantage of using a MAC CE is that there are more bits available to include information than with PDCCH.

Correspondingly, the use of one message or the other depends very much on the specific needs in the communication system and in particular the relay node.

Additional Content of PUSCH Deactivation Command

The PUSCH deactivation command, encoded in any of the above-described ways, may contain further information, apart from the above-explained SCell identification, RN C-RNTI, bitmaps, flags etc.

For example, the PUSCH deactivation command may include a delay parameter which is to be applied by the relay node before deactivating the PUSCH of the SCell. As apparent, the purpose of the delay parameter is to instruct the relay node to wait for a certain time before actually applying the configuration of not using the PUSCH for SCell. The delay parameter may include a value for an amount of time or a particular subframe, radio frame or any other suitable time indication that suits the above-explained purpose.

It is advantageous to have a delay time configured for the PUSCH deactivation command. In more detail, the time the relay node needs to decode the subframe including the PUSCH deactivation command may vary from relay node to relay node. The delay time makes sure that the relay node has enough time to decode the PUSCH-deactivation command, be it transmitted within a PDCCH DCI format or within a MAC CE. Further, the delay parameter allows synchronizing the deactivation between the DeNB and the relay node, and thus a pre-determined delay time can be introduced to configure the deactivation.

The pre-determined time delay parameter may depend on how the PUSCH deactivation command is transmitted. For instance, decoding the PDCCH is faster than decoding the MAC CE; therefore, the pre-determined delay time for the MAC CE should be longer than the one for the PDCCH. Furthermore, the delay introduced by the delay parameter also makes sure that the HARQ buffers can be emptied before the PUSCH-deactivation command is applied. 8 HARQ processes are defined for the SCell and are active in buffering data to be sent on the uplink to the DeNB. When the PUSCH-deactivation command is received by the relay node, the delay time should be configured such that the data stored in the HARQ buffers can be transmitted to the DeNB. The buffers of all or some of the HARQ processes for the SCell are then flushed when the PUSCH-deactivation is finally applied after the delay time expires.

As already explained, the PUSCH should be deactivated and activated dynamically. One possible way to implement this is to include an expiry timer into the PUSCH deactivation command. The relay node deactivates the PUSCH for the SCell only for a certain amount of time, which is indicated by the so-called expiry timer. The expiry timer indicates a certain amount of time, a particular subframe, radio frame or any other suitable time indication to suit the above-explained purpose (e.g. in milliseconds or number of subframes). As one of the many possible examples, a time is indicated in milliseconds, and the relay node starts after the delay time a corresponding timer for the indicated milliseconds of the expiry timer. After the time, indicated by the expiry timer, the relay node activates the PUSCH for the SCell again, and thus returns to the original configuration in which it can use the SCell for data uplink transmissions. Of course, the DeNB will have the same understanding and knows when it is possible again to schedule the relay node for uplink transmissions on the PUSCH of the SCell.

The duration can be expressed in the case of encoding the PUSCH deactivation command in the PDCCH as part of the payload by binary means (which has various bits length) and the case of encoding the PUSCH-deactivation command in the MAC CE by adding bits left in the extended MAC CE to signal the number of frames/milliseconds that the command is valid.

According to a further embodiment of the invention, the PUSCH-deactivation command may define patterns of PUSCH deactivation/activation. In more detail, the PUSCH deactivation command may already define time periods in which the PUSCH of the SCell is deactivated and time periods in which the PUSCH of the SCell is active. In addition, the defined time periods of PUSCH deactivation/activation may then be applied periodically by the relay node until otherwise instructed.

In more detail, an off-time indication is included into the PUSCH deactivation command for instructing the relay node for how long to not use the PUSCH for the SCell. A further on-time indication is included which instructs the relay node for how long to use the PUSCH for the SCell. These two time parameters are then used alternately to activate and deactivate the PUSCH for the SCell of the relay node. This allows defining active and inactive PUSCH periods of the SCell for a much longer time. This may reduce the signaling going back and forth between the DeNB and the relay node.

The definition of patterns can be easily implemented using e.g. the MAC CE which provides more bits for encoding the patterns than the PDCCH formats.

PUSCH Re-Activation

Naturally, the PUSCH of the SCell shall not remain deactivated all the time, but instead should be deactivated and re-activated according to the necessities of the communication system. Therefore, it is advisable to implement a mechanism that allows activating the PUSCH of the SCell after being deactivated. A possible solution according to an embodiment of the invention is already presented above, i.e. using the expiry timer after which the DeNB starts scheduling again the PUSCH and the relay node again starts to expect corresponding grants from the DeNB for using the PUSCH of the SCell.

Another option is to use the above-introduced patterns to alternately deactivate and activate the PUSCH of the SCell of the relay node. In this case, however, it would be advisable to define a command that interrupts this pattern configuration and allows the DeNB and relay node to return to the original configuration in which the PUSCH is active for the SCell and can be scheduled by the DeNB as usual.

Similarly, if no pattern configuration is used, a PUSCH activation command similar to the PUSCH deactivation command can be used to activate the PUSCH of the SCell. For instance, the PUSCH-activation command might include the previously discussed flag=0 to activate the PUSCH again for the SCell. Or the PUSCH-activation might include a bitmap that is inverse to the one of the PUSCH-deactivation. The PUSCH activation command can be encoded in a similar way to the PUSCH deactivation command, i.e. in a MAC CE, as a (R)-PDCCH or any other suitable message. Furthermore, the content of the PUSCH activation command need not be the same as the PUSCH deactivation command, since the relay node merely needs to be instructed to return to the original PUSCH configuration of the SCell; no details as to which subframes, HARQ process IDs etc. need to be included in the PUSCH activation command, though this information may be included.

Therefore, in this case one signal is used for deactivating the PUSCH and another signal would be required in case it is needed to return to normal operation. If the expiry timer is used as explained above, a second signal is not necessary, since after the duration period ends, the relay node will automatically revert to the original configuration for the SCell.

FIG. 18 depicts the message exchange between the DeNB and the relay node and the timing of the messages, including the time delay parameter Td and the time expiry parameter Te, as introduced above. In particular, the DeNB transmits the PUSCH deactivation command, which is received by the relay node at time t0.

The PUSCH deactivation command is decoded in the relay node. For instance, in case the MAC CE is used for encoding the PUSCH deactivation command, it takes about 2 ms to decode the PDDCH (as shown in FIG. 18) or PDSCH over which the MAC CE was transmitted, and it takes in total 6 ms to decode the MAC CE to process the PUSCH deactivation command. Correspondingly, an ACK message is transmitted from the relay node to the DeNB 4 subframes after receiving the command, the ACK message referring to the successful decoding of the PDCCH/PDSCH.

After decoding the PUSCH-deactivation command, i.e. in this case the MAC CE, the relay node is aware that the PUSCH for the SCell will not be scheduled by the DeNB. As explained above, the PUSCH-deactivation command may include a time delay parameter Td, after which the PUSCH is to be deactivated. The relay node knows the first subframe for which the PUSCH will be deactivated, and can schedule an uplink transmission from the UE(s) in time, so as to utilize the PUSCH-deactivation of the SCell as much as possible. Correspondingly, at the earliest, the relay node can transmit an uplink grant to a UE at time t1−4 ms. Naturally, t1−4 ms cannot be before decoding the PUSCH-deactivation command, i.e. the 6 ms in case of encoding it within the MAC CE. The corresponding uplink transmission from the UE to the relay node 4 subframes later will be received by the relay node, when the PUSCH-deactivation period begins.

FIG. 18 also discloses the use of an expiry parameter Te, after which the relay node can use the PUSCH for the SCell again. Correspondingly, the DeNB could transmit an uplink grant such that the first uplink transmission from the relay node is transmitted with the first possible subframe after re-activation of the PUSCH for the SCell (i.e. receive UL grant at time t2−4 ms).

According to a further embodiment of the invention, the relay node may proactively request the deactivation of the PUSCH for a certain SCell e.g. to schedule more uplink resources on the access link. In this case, a corresponding PUSCH-deactivation request message is transmitted from the relay node to the DeNB. This may be done on any available uplink opportunity on PCell or any of the available SCells.

The relay node may request the DeNB to deactivate all subframes or certain subframes or a subset of subframes for the SCell. The request by the relay node may contain all information as explained above for the PUSCH-deactivation command, e.g. the expiry timer, delay timer, patterns, subframes (bitmap or flag), HARQ process IDs, component carrier identification etc.

Figure 19:
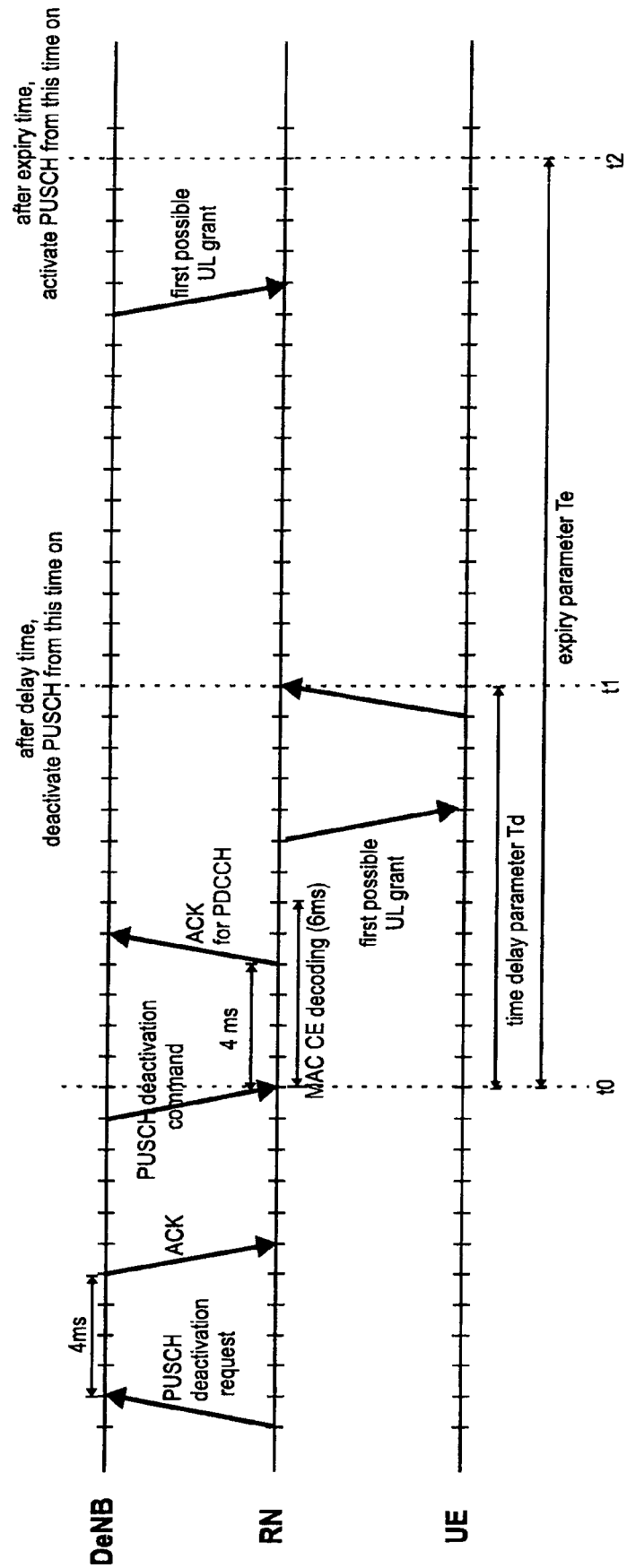
FIG. 19 is a time diagram similar to the one of FIG. 18, in which the relay node requests the deactivation of the PUSCH for an SCell from the DeNB according to a further embodiment of the invention.

In this case, the relay node decides when to deactivate the PUSCH in the SCell and accordingly instructs the DeNB to transmit the PUSCH deactivation command back to the relay node. For instance, the PUSCH-deactivation request may be sent autonomously by the relay node, when it needs to schedule more UEs on the access link. The relay node is the only one who knows when it is necessary to schedule uplink resources for UEs on the Uu interface due to the buffer status repots (BSR) sent from the UEs attached to that relay node. Correspondingly, the relay node after getting the BSRs from the attached UEs, sends a signal to the DeNB to request the non-scheduling period on the backhaul link, as depicted in FIG. 19. FIG. 19 is very similar to FIG. 18, however refers to the embodiment where the relay node decides to apply the PUSCH-deactivation and request the DeNB accordingly.

In one embodiment of the invention, the DeNB, after receiving the request from the relay node, decides when to send this signal and includes corresponding parameters, such as the delay timer or the expiry timer. The relay node applies the PUSCH-deactivation command according to the included instructions and parameters.

Carrier aggregation is at the moment not standardized for the access link, i.e. between the relay node and the UEs attached to it. Correspondingly, since there is only one frequency carrier in the access link, only one SCell in the backhaul is operating in an inband mode with respect to the carrier frequency of the access link.

However, in the future this might change, and carrier aggregation may also be decided for the access link, in the same or similar way as in the backhaul link. In this case, there will be various component carriers with differing carrier frequencies, and consequently, there may be not only one but several SCells operating in inband mode. The various embodiments of the invention are then applicable to all the SCells, and the principles introduced up to now apply in a similar way. For example, the PUSCH-deactivation command not only refers to one SCell but may refer to several SCells at the same time, identifying in the command all SCells which PUSCH is not to be scheduled.

DeNB

Figure 20:
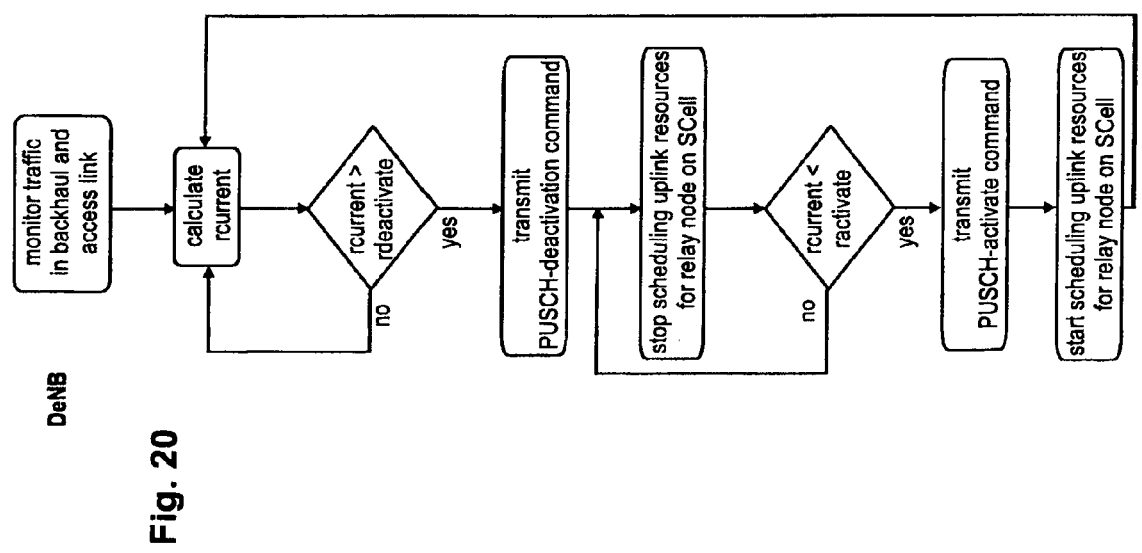
FIG. 20 is a flow diagram illustrating the steps performed by the DeNB for a method according to one of the embodiments of the invention.

FIG. 20 is a flow diagram illustrating the steps performed by the DeNB according to one particular embodiment of the invention. As apparent, the DeNB is the one deciding on whether to deactivate the PUSCH on the SCell or not, and monitors for said purpose the backhaul link and the access link. The DeNB then repeatedly calculates a ratio rcurrent, which reflects the current situation in the backhaul and access link. The calculated rcurrent is compared to a pre-determined ratio rdeactivate that indicates when to deactivate the PUSCH of the SCell of the relay node. Once the rcurrent is higher than the rdeactivate, the DeNB prepares and transmits the PUSCH-deactivation command to the relay node. At basically the same time, the DeNB stops scheduling any uplink resources for the relay node in the SCell, because of the deactivation.

Figure 21:
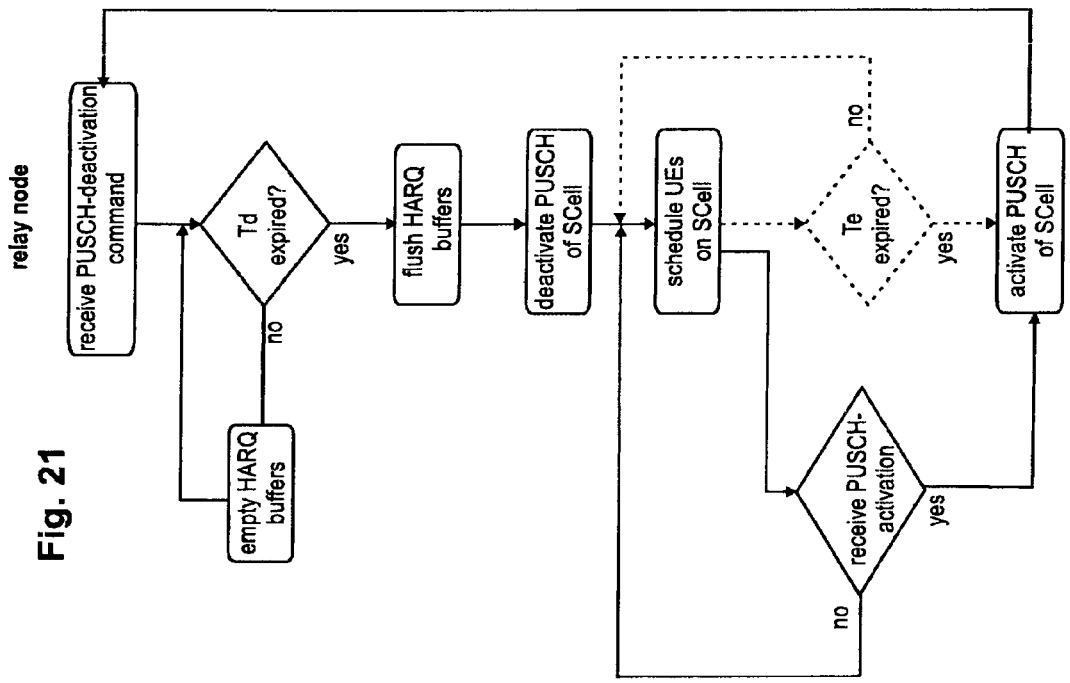
FIG. 21 is a flow diagram illustrating the steps performed by the relay node for a method according to embodiments of the invention.

FIG. 21 is a flow diagram illustrating the steps performed by the relay node according to particular embodiments of the invention. The relay node receives the PUSCH-deactivation command and starts emptying its HARQ process buffers, i.e. transmits those data packets in the uplink that are still in the HARQ process buffers. This is done as long as the time delay does not expire. Usually, the time delay parameter Td will be configured by the DeNB, such that the relay node will have time to transmit all remaining data packets in the uplink, before deactivating the PUSCH of the SCell.

Once the delay timer Td expires, the HARQ buffers are flushed in the relay node for the SCell which PUSCH is then deactivated. The relay node may thus use all of the SCell for scheduling the UEs attached to it.

As apparent from FIG. 20, the DeNB keeps monitoring the traffic in the backhaul and access link, and keeps calculating the ratio rcurrent. The DeNB compares the ratio rcurrent against a pre-determined ratio ractivate, for determining when it would be advantageous to re-activate the PUSCH for the SCell of the relay node. If the ratio rcurrent falls below the pre-determined ratio ractivate, a corresponding PUSCH-activate command is transmitted from the DeNB to the relay node. The DeNB then may start to schedule again uplink resources for the relay node on the SCell; preferably, after a short time, needed by the relay node to decode and process the PUSCH-activation command.

The relay node receives the PUSCH-activation command (see FIG. 21), and re-activates the PUSCH for the SCell, thus returning to the original configuration of the SCell.

FIG. 21 also illustrates the alternative embodiment, in which no particular PUSCH-activation command is necessary, but an expiry timer is used instead. The expiry timer is transmitted within the PUSCH-deactivation command, and is started upon deactivating the PUSCH of the SCell. When the expiry timer Te expires, the relay node re-activates the PUSCH of the SCell. In this alternative it is not necessary for the DeNB to transmit the PUSCH-activate command, as done according to FIG. 20. Less signaling and less processing in the DeNB is necessary.

Figure 22:
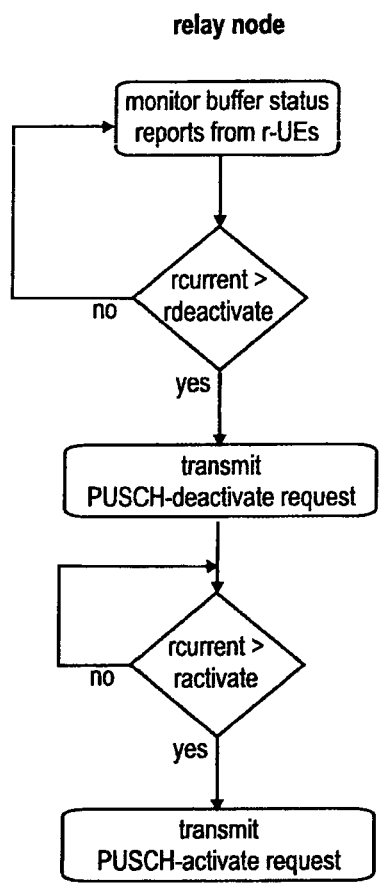
FIG. 22 is a flow diagram illustrating the steps performed by the relay node for a method according to an embodiment of the invention.

FIG. 22 discloses a flow diagram for the relay node, and in particular for the case in which the relay node decides on when to deactivate the PUSCH of the SCell. In this particular embodiment of the invention, the relay node is monitoring the buffer status reports received from the UEs, and calculates a parameter (called rcurrent) therefrom. This parameter rcurrent is repeatedly compared to a pre-determined parameter rdeactivate, which is chosen to decide when to deactivate the PUSCH of the SCell. Accordingly, a PUSCH-deactivation request message is transmitted from the relay node to the DeNB.

The DeNB is adapted to process the PUSCH-deactivation request message and prepare in accordance with the instructions in the request message, a PUSCH-deactivation command, as previously explained.

The relay node also keeps monitoring the buffer status reports to decide when to re-activate its PUSCH on the SCell. To said purpose, a comparison of the calculated rcurrent is continuously being made against a pre-determined parameter ractivate. When positive, the PUSCH-activate request message is transmitted to the DeNB.

Though above only some embodiments have been described in more detail, the present invention is not restricted to these particular embodiments presented above. Variations or mixtures of the various embodiments are possible as well, and are within the skilled person's ability to implement. For instance, the decision to deactivate/activate a PUSCH of an SCell may also be taken by another entity. Or the DeNB might decide to deactivate the PUSCH, and the relay node might decide to re-activate the PUSCH again, correspondingly transmitting a PUSCH-activate request message as discussed above.

Alternatively, when the relay node decides to deactivate the PUSCH of an SCell, it may not transmit the PUSCH-deactivate request to the DeNB, but will directly deactivate the PUSCH of the SCell without a separate instruction by the DeNB. However, in this case, the DeNB should be informed by the relay node that the PUSCH of a particular SCell is deactivated. The same applies to the re-activation procedure, in which case the DeNB would only be informed when the PUSCH will be again available for the SCell.

A delay parameter was described in connection with the deactivation of the PUSCH of the SCell. However, the same or a similar delay parameter may be used for the PUSCH-activation of the SCell.

UE

The above-described embodiments of the invention are transparent to the UEs attached to the relay node.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently and its enhancements (LTE-A) discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for dynamically configuring an uplink shared channel of a relay node in a communication system, the method comprising the following steps:

connecting the relay node to a base station over a first communication link that includes a first component carrier using a carrier frequency f2 and a second component carrier using a carrier frequency f1, the first component carrier and said second component carrier respectively providing an uplink and downlink shared channel between the base station and the relay node, attaching at least one user equipment to the relay node over a second communication link using the carrier frequency f1; and dynamically instructing the relay node by the base station to deactivate/activate only the uplink shared channel of the relay node for the second component carrier in predetermined subframes such that the second component carrier is used only for downlink, wherein the relay node requests the base station to dynamically instruct the relay node to deactivate/activate the uplink shared channel of the relay node for the second component carrier, preferably based on buffer status reports received from user equipments attached to the relay node.

2. The method according to claim 1, wherein the step of instructing the relay node to deactivate/activate the uplink shared channel is based on traffic conditions in the first and second communication link.

3. The method according to claim 1, wherein the base station determines to deactivate the uplink shared channel of the relay node for the second component carrier by performing the steps of:

monitoring data traffic transmitted from the base station to the relay node and monitoring buffer status reports received from the relay node, determining a ratio between the data traffic and a value indicated in the buffer status reports, in case the determined ratio is greater than a first pre-determined ratio, performing the step of deactivating the uplink shared channel of the relay node for the second component carrier in pre-determined subframes, and in case the determined ratio is lower than a second pre-determined ratio, performing the step of activating the uplink shared channel of the relay node for the second component carrier in pre-determined subframes.

4. The method according to claim 1, wherein the deactivating/activating is instructed by transmitting a deactivation/activation message to the relay node.

5. The method according to claim 4, wherein the deactivation/activation message is transmitted within a control element of a media access control protocol layer, or wherein the deactivation/activation message is transmitted within an uplink grant message transmitted on a downlink control channel from the base station to the relay node or, wherein the deactivation/activation message is transmitted within a downlink assignment message transmitted on the downlink control channel from the base station to the relay node.

6. The method according to claim 1, wherein the uplink shared channel is deactivated/activated in all subframes of the second component carrier, preferably using a deactivation/activation flag.

7. The method according to claim 1, wherein the uplink shared channel is deactivated/activated in a subset out of all subframes of the second component carrier, preferably being indicated by using a bitmap.

8. The method according to claim 1, wherein the instruction to deactivate/activate the uplink shared channel of the relay node for the second component carrier includes a time delay parameter for the relay node to wait before deactivating/activating the uplink shared channel of the relay node for the second component carrier, and/or includes an expiry parameter for the relay node to reverse the deactivating/activating of the uplink shared channel of the relay node for the second component carrier, and/or includes information for defining a pattern of deactivation/activation periods to be repeatedly applied by the relay node.

9. A base station for dynamically configuring an uplink shared channel of a relay node in a communication system, the base station comprising:

a processor and transmitter, wherein:

the relay node is connected to the base station over a first communication link that includes a first component carrier using a carrier frequency f2 and a second component carrier using a carrier frequency f1, the first component carrier and said second component carrier respectively providing an uplink and downlink shared channel between the base station and the relay node, at least one user equipment is attached to the relay node over a second communication link using the carrier frequency f1, and the processor and transmitter is adapted to dynamically instruct the relay node to deactivate/activate only the uplink shared channel of the relay node for the second component carrier in pre-determined subframes such that the second component carrier is used only for downlink, wherein the relay node requests the base station to dynamically instruct the relay node to deactivate/activate the uplink shared channel of the relay node for the second component carrier, preferably based on buffer status reports received from user equipments attached to the relay node.

10. The base station according to claim 9, wherein the processor is adapted to:

monitor data traffic transmitted from the base station to the relay node and monitors buffer status reports received from the relay node, determine a ratio between the data traffic and a value indicated in the buffer status reports, in case the determined ratio is greater than a first pre-determined ratio, to deactivate the uplink shared channel of the relay node for the second component carrier in pre-determined subframes, and in case the determined ratio is lower than a second pre-determined ratio, to activate the uplink shared channel of the relay node for the second component carrier in pre-determined subframes.

11. The base station according to claim 9, the transmitter adapted to transmit a deactivation/activation message to the relay node using the first or second component carrier for instructing the rely node to deactivate/activate the uplink shared channel of the relay node for the second component carrier in pre-determined subframes.

12. The base station according to claim 9, wherein the processor is adapted to decide upon deactivating/activating the uplink shared channel in all subframes of the second component carrier, or in a subset out of all subframes of the second component carrier.

13. The base station according to claim 9, wherein the processor is adapted to include a time delay parameter into the instruction to deactivate/activate the uplink shared channel of the relay node for the second component carrier, the time delay parameter being for the relay node to wait before deactivating/activating the uplink shared channel for the relay node for the second component carrier, and/or to include an expiry parameter for the relay node to reverse the deactivating/activating of the uplink shared channel of the relay node for the second component carrier, and/or to include information for defining a pattern of deactivation/activation periods to be repeatedly applied by the relay node.

14. The base station according to claim 9, comprising:
a receiver for receiving from the relay node a request to dynamically instruct the relay node to deactivate/activate the uplink shared channel of the relay node for the second component carrier.

15. A relay node for dynamically configuring an uplink shared channel of the relay node in a communication system, the relay node comprising:
a hardware processor, wherein:
the relay node is connected to a base station over a first communication link that includes a first component carrier using a carrier frequency f2 and a second component carrier using a carrier frequency f1, the first component carrier and said second component carrier respectively providing an uplink and downlink shared channel between the base station and the relay node,
at least one user equipment is attached to the relay node over a second communication link using the carrier frequency f1, and
the hardware processor is adapted to deactivate/activate only the uplink shared channel of the relay node for the second component carrier in pre-determined subframes such that the second component carrier is used only for downlink,
wherein the relay node requests the base station to dynamically instruct the relay node to deactivate/activate the uplink shared channel of the relay node for the second component carrier, preferably based on buffer status reports received from user equipments attached to the relay node.

16. The relay node according to claim 15, wherein the hardware processor is further adapted to monitor buffer status reports received from the user equipment, and to decide to request the base station to dynamically instruct the relay node to deactivate/activate the uplink shared channel of the relay node for the second component carrier, based on the monitored buffer status reports.

17. The relay node according to claim 15 further comprising a transmitter adapted to transmit a deactivation/activation request message to the base station to request the base station to dynamically instruct the relay node to deactivate/activate the uplink shared channel of the relay node for the second component carrier.

18. The relay node according to claim 17, wherein the deactivation/activation request message includes information about which pre-determined subframes are to be deactivated/activated.

19. The relay node according to claim 15, further comprising a receiver adapted to receive a deactivation/activation message and wherein the processor is adapted to deactivate/activate all or a subset out of all subframes of the second component carrier, based on information included in the received deactivation/activation message.

* * * * *